US011454532B2

(12) United States Patent
Kurokawa et al.

(10) Patent No.: US 11,454,532 B2
(45) Date of Patent: Sep. 27, 2022

(54) ULTRASONIC DISTANCE MEASURING DEVICE

(71) Applicant: DENSO CORPORATION, Kariya (JP)

(72) Inventors: Kyoko Kurokawa, Kariya (JP); Takuya Koizumi, Kariya (JP); Akihiro Konno, Kariya (JP); Hironori Iwamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 140 days.

(21) Appl. No.: 16/921,141

(22) Filed: Jul. 6, 2020

(65) Prior Publication Data

US 2021/0010848 A1    Jan. 14, 2021

(30) Foreign Application Priority Data

Jul. 10, 2019   (JP) .............................. JP2019-128736

(51) Int. Cl.
*G01F 23/2962*   (2022.01)
*G01B 17/00*   (2006.01)

(52) U.S. Cl.
CPC ......... *G01F 23/2962* (2013.01); *G01B 17/00* (2013.01)

(58) Field of Classification Search
CPC .............................. G01F 23/2962; G01B 17/00
See application file for complete search history.

(56) References Cited

U.S. PATENT DOCUMENTS

| 4,315,325 | A | * | 2/1982 | Blades | .................... G01S 7/527 367/98 |
| 4,785,664 | A | * | 11/1988 | Reebs | ................. G01F 23/2962 340/621 |
| 4,901,245 | A | * | 2/1990 | Olson | .................... G01F 23/296 340/621 |

(Continued)

FOREIGN PATENT DOCUMENTS

| JP | 2006-145403 A | 6/2006 |
| JP | 2018-119808 A | 8/2018 |

(Continued)

OTHER PUBLICATIONS

U.S. Appl. No. 16/920,886, filed Jul. 6, 2020, Konno et al.
U.S. Appl. No. 16/785,815, filed Feb. 10, 2020, Koizumi et al.

*Primary Examiner* — Nimeshkumar D Patel
*Assistant Examiner* — Jean F Morello
(74) *Attorney, Agent, or Firm* — Posz Law Group, PLC

(57) ABSTRACT

A first arithmetic circuit computes a propagation velocity of an ultrasonic wave based on a first time difference between an output timing, at which an ultrasonic element outputs an ultrasonic wave, and a reference timing, at which a comparator circuit outputs a detection signal on reflection off a distal end of a reference pipe, and a length of the reference pipe. A period circuit sets a propagation path detection period to detect a liquid level timing, at which the comparator circuit outputs the detection signal on reflection off the liquid level, based on a longest and shortest propagation path lengths and the propagation velocity. A second arithmetic (Continued)

circuit computes the length of the propagation path based on a second time difference, which is between the liquid level timing and the output timing during the propagation path detection period, and the propagation velocity.

11 Claims, 15 Drawing Sheets

(56) References Cited

U.S. PATENT DOCUMENTS

| | | | | |
|---|---|---|---|---|
| 5,319,972 | A * | 6/1994 | Oblak | G21C 17/035 |
| | | | | 73/290 R |
| 5,877,997 | A * | 3/1999 | Fell | G01F 23/2962 |
| | | | | 367/99 |
| 9,458,759 | B2 * | 10/2016 | Rollinger | F16H 57/0412 |
| 2005/0284217 | A1 * | 12/2005 | Miyagawa | G01F 23/2962 |
| | | | | 73/290 V |

FOREIGN PATENT DOCUMENTS

| | | |
|---|---|---|
| JP | 2018-194407 A | 12/2018 |
| JP | 2018-194408 A | 12/2018 |

* cited by examiner

ULTRASONIC DISTANCE MEASURING DEVICE

CROSS REFERENCE TO RELATED APPLICATION

The present application claims the benefit of priority from Japanese Patent Application No. 2019-128736 filed on Jul. 10, 2019. The entire disclosures of all of the above applications are incorporated herein by reference.

TECHNICAL FIELD

The present disclosure relates to an ultrasonic distance measuring device that measures a length of a propagation path for an ultrasonic wave.

BACKGROUND

A known liquid level device generates ultrasonic waves toward the liquid level of fuel, detects an ultrasonic wave reflecting off the liquid level, and thereby detects the position of the liquid level.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
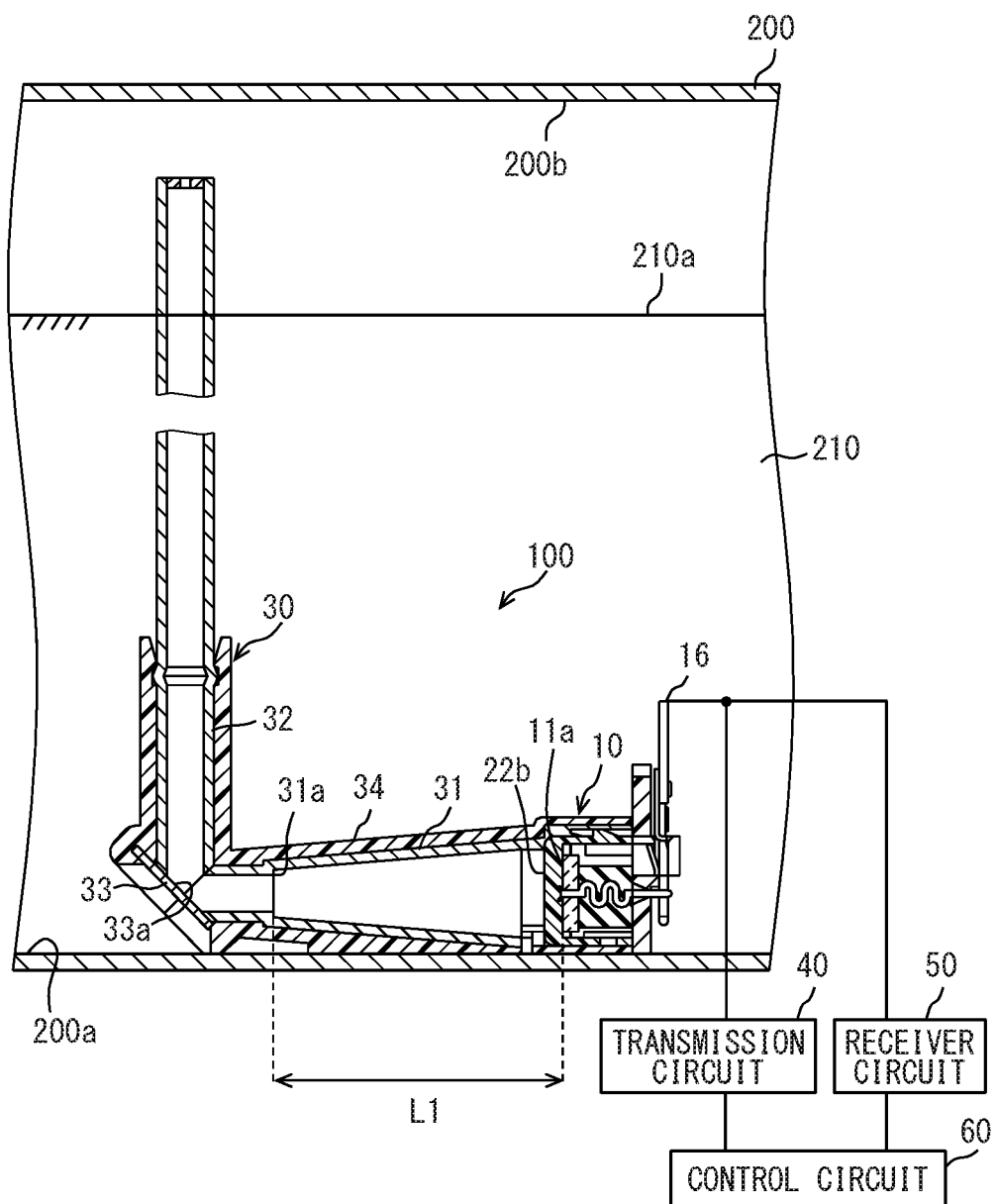
FIG. 1 is an explanatory diagram illustrating an overall configuration of a ultrasonic distance measuring device.
Figure 2:
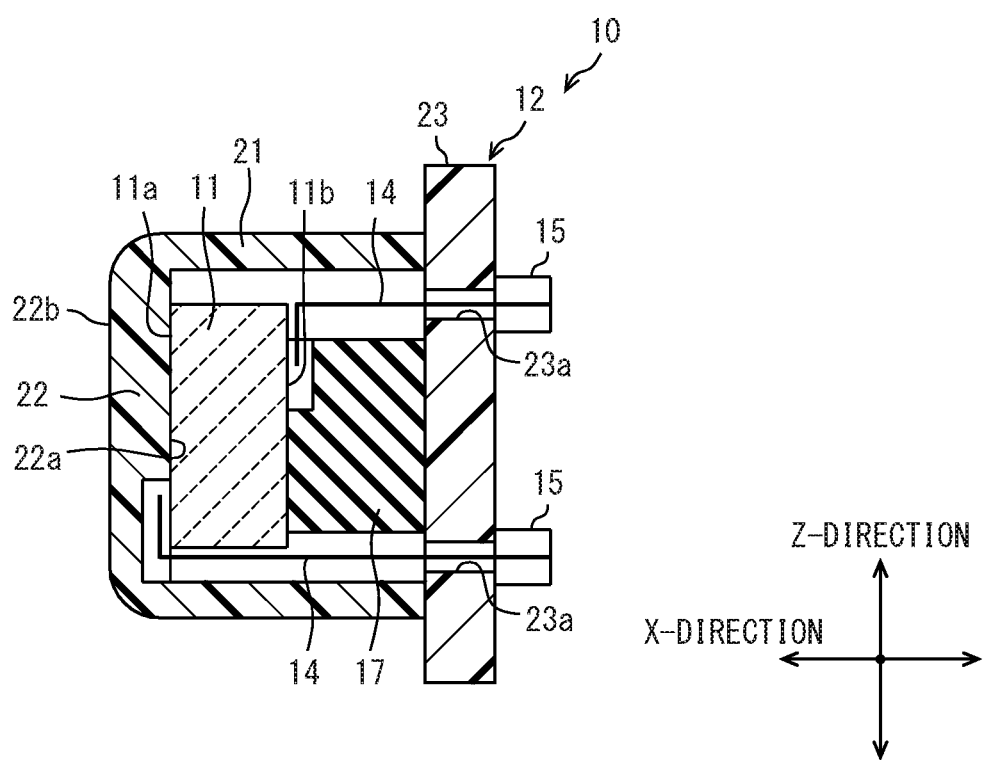
FIG. 2 is a sectional view illustrating a schematic configuration of an ultrasonic sensor.

As follows, examples of the present disclosure will be described.

According to an example of the present disclosure, a liquid level device amplifies and rectifies a reception signal based on a detected ultrasonic wave and converts the signal into a detection signal. According to an example, a liquid level device computes the propagation time of the ultrasonic wave based on the time that causes the detection signal to be larger than a threshold value signal. The ultrasonic wave propagates to the liquid level from the liquid level device, reflects off the liquid level, and returns to the liquid level device. The liquid level measurement device computes the liquid level position based on the propagation time and an already computed speed of the ultrasonic wave, for example.

However, a noise occurring on the liquid level device may inaccurately indicate the time that causes the detection signal to be larger than a threshold value signal. An inaccurate propagation time may decrease the accuracy of detecting liquid level positions.

According to an example of the disclosure, an ultrasonic distance measuring device is configured to measure a length of an ultrasonic wave propagation path between a liquid level of a detected fluid reserved in a tank and an ultrasonic element. The ultrasonic distance measuring device comprises a transmission pipe including a reference pipe and a detection pipe. The reference pipe has a predetermined length and extends in a horizontal direction orthogonal to a height direction along which the ultrasonic element and the liquid level are placed. The detection pipe extends in the height direction toward the liquid level from a distal end of the reference pipe, such that a cavity of the reference pipe and a cavity of the detection pipe communicate with each other. The ultrasonic distance measuring device further comprises the ultrasonic element configured to generate an ultrasonic wave in the cavity of the reference pipe toward the distal end of the reference pipe and to convert an input ultrasonic wave into an electric signal. The ultrasonic distance measuring device further comprises a transmission circuit configured to output a drive signal that causes the ultrasonic element to generate an ultrasonic wave. The ultrasonic distance measuring device further comprises a comparator circuit configured to output a detection signal when the electric signal converted by the ultrasonic element is greater than a threshold value. The ultrasonic distance measuring device further comprises a storage unit configured to store the predetermined length of the reference pipe, a longest propagation path length of the propagation path, and a shortest propagation path length of the propagation path. The ultrasonic distance measuring device further comprises a first arithmetic circuit configured to compute a propagation velocity of an ultrasonic wave propagating through the propagation path based on a first time difference between an output timing, at which the ultrasonic element outputs an ultrasonic wave, and a reference timing, at which the comparator circuit outputs the detection signal based on an ultrasonic wave reflecting off the distal end of the reference pipe, and the predetermined length of the reference pipe stored in the storage unit. The ultrasonic distance measuring device further comprises a period circuit configured to set a propagation path detection period to detect a liquid level timing, at which the comparator circuit outputs the detection signal based on an ultrasonic wave reflecting off the liquid level, based on the longest propagation path length and the shortest propagation path length stored in the storage unit and the propagation velocity of an ultrasonic wave computed by the first arithmetic circuit. The ultrasonic distance measuring device further comprises a second arithmetic circuit configured to compute the length of the propagation path based on a second time difference, which is between the liquid level timing and the output timing during the propagation path detection period, and the propagation velocity of an ultrasonic wave computed by the first arithmetic circuit.

An ultrasonic wave generated from the ultrasonic element propagates toward a liquid level. The ultrasonic wave partially reflects off the liquid level. The reflected ultrasonic wave partially returns to the ultrasonic element. Time elapses while the ultrasonic wave is generated from the ultrasonic element, reflects off the liquid level, and returns to the ultrasonic element. The time can be found based on the length of an ultrasonic wave propagation path between the ultrasonic element and the liquid level and propagation velocity of the ultrasonic wave propagating through the propagation path.

On condition of the constant propagation velocity, the longest propagation time corresponds to the longest length of the propagation path. The shortest propagation time corresponds to the shortest length of the propagation path. It is expected that an ultrasonic wave reflecting off the liquid level returns to the ultrasonic element at the timing between the longest propagation time and the shortest propagation time. The comparator circuit may output a detection signal during a period except the period between the longest propagation time and the shortest propagation time. Then, it is supposed that the detection signal does not correspond to the position of the liquid level.

In consideration of this, the present disclosure provides the propagation path detection period to detect the liquid level timing for the comparator circuit to output a detection signal corresponding to the ultrasonic wave reflecting off the liquid level based on the longest propagation path length and the shortest propagation path length of the ultrasonic wave and the propagation velocity of the ultrasonic wave. The propagation path distance is computed based on the second time difference between the liquid level timing and the output timing during the propagation path detection period; and the propagation velocity of the ultrasonic wave.

This configuration may enable to inhibit the length of the propagation path between the ultrasonic element and the liquid level from being measured by the use of a signal not based on the position of the liquid level. This configuration enables to inhibit the distance measurement accuracy from degrading.

First Embodiment

With reference to FIGS. 1 through 14, the description below explains an ultrasonic distance measuring device 100. In the description below, three directions x, y, and z are orthogonal to each other. The x-direction corresponds to a horizontal direction. The z-direction corresponds to a height direction.

As illustrated in FIG. 1, the ultrasonic distance measuring device 100 is provided in a fuel tank 200 for vehicles. The ultrasonic distance measuring device 100 detects a liquid level 210a of fuel 210 reserved in the fuel tank 200. The fuel 210 represents gasoline, for example. The fuel 210 is assumed to be a detected fluid.

Figure 3:
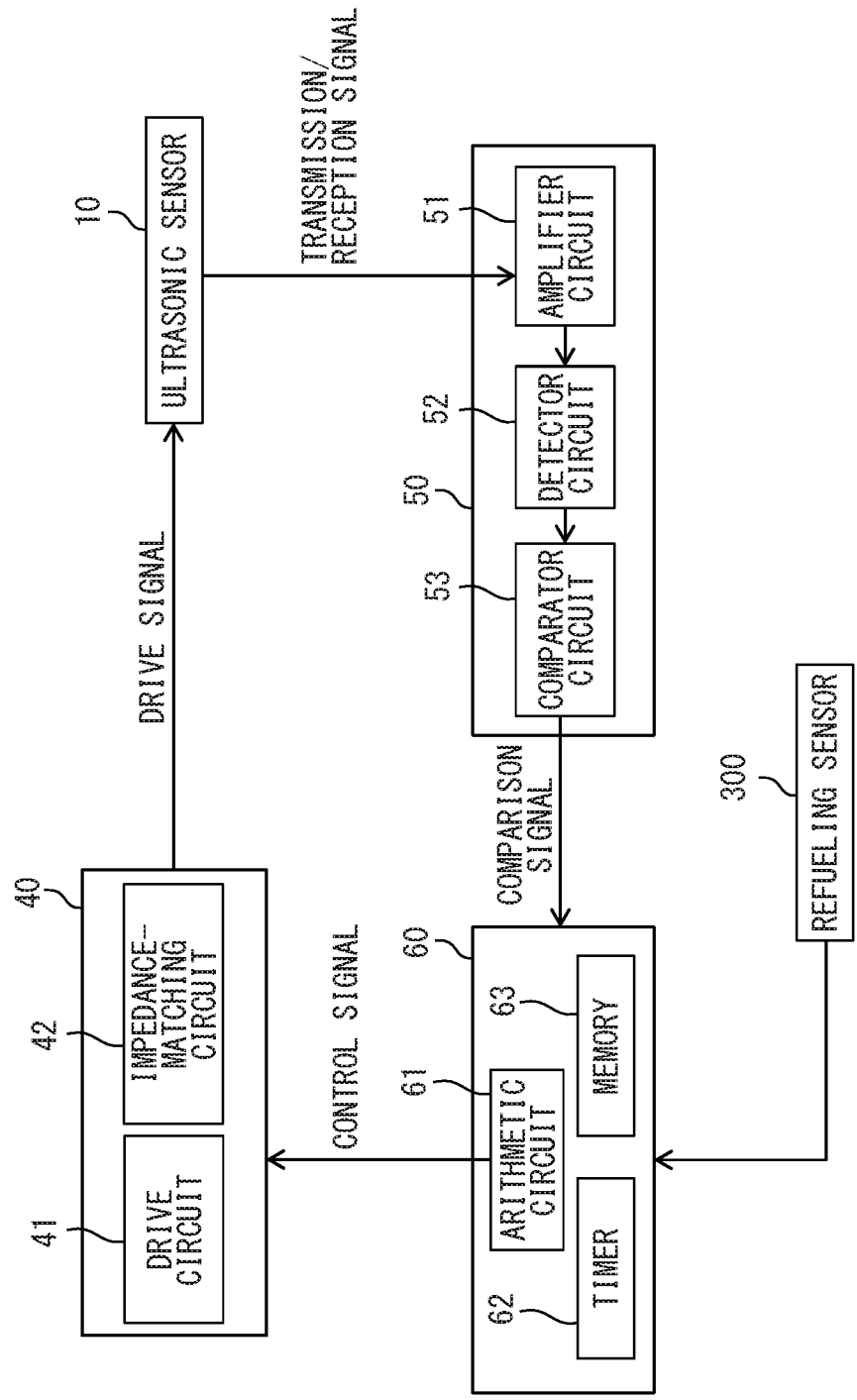
FIG. 3 is a block diagram illustrating signals transmitted through the ultrasonic distance measuring device.

As illustrated in FIGS. 1 and 3, the ultrasonic distance measuring device 100 includes an ultrasonic sensor 10, a transmission pipe 30, a transmission circuit 40, a receiver circuit 50, and a control circuit 60. The ultrasonic sensor 10 is provided at the transmission pipe 30. The ultrasonic sensor 10 is electrically connected to the transmission circuit 40 and the receiver circuit 50. The transmission circuit 40 and the receiver circuit 50 are electrically connected to the control circuit 60.

The ultrasonic sensor 10 and the transmission pipe 30 are provided at a bottom face 200a of the fuel tank 200. The ultrasonic sensor 10 and the transmission pipe 30 are placed in the fuel 210. An ultrasonic wave generated from the ultrasonic sensor 10 propagates through the fuel 210 in the fuel tank 200.

The ultrasonic sensor 10 and the transmission pipe 30 may be provided at a top face 200b distanced from the bottom face 200a in the z-direction. The z-direction corresponds to the vertical direction when a vehicle stops on a flat surface. The top face 200b is positioned above the liquid level 210a of the fuel 210 in the vertical direction. The ultrasonic sensor 10 and the transmission pipe 30 are positioned outside the fuel 210. An ultrasonic wave generated from the ultrasonic sensor 10 propagates through the air in the fuel tank 200.

Ultrasonic Sensor

The ultrasonic sensor 10 includes an ultrasonic element 11 and a case 12. The ultrasonic element 11 represents an ultrasonic transducer to generate ultrasonic waves. The ultrasonic element 11 is made of a piezoelectric material such as lead zirconium titanate (PZT) that causes the piezoelectric effect. The piezoelectric material changes in the volume in response to an applied voltage and generates a voltage in response to an applied external force.

The ultrasonic element 11 is shaped into a disk whose thickness direction corresponds to the x-direction. The ultrasonic element 11 includes a contact face 11a and a reverse face 11b positioned in the x-direction. An electrode is printed on the contact face 11a and the reverse face 11b. The electrode is formed in the entirety of the contact face 11a and the reverse face 11b.

One end of a lead 14 is soldered or crimped to the electrode formed on the contact face 11a and the reverse face 11b. The other end of the lead 14 is connected to a terminal 15 illustrated in FIG. 2. The terminal 15 is connected to a lead wire 16 illustrated in FIG. 1. The lead wire 16 is electrically connected with the transmission circuit 40 and the receiver circuit 50.

The case 12 provides storage space to contain the ultrasonic element 11. The case 12 is made of an insulating resin material. Specifically, the case 12 includes a cylindrical portion 21, a bottom portion 22, and a cover portion 23. The bottom portion 22 is integrally formed with the cylindrical portion 21. The cover portion 23 is formed independently of the cylindrical portion 21 and the bottom portion 22.

The cylindrical portion 21 extends in an axial direction corresponding to the x-direction orthogonal to the z-direction. The bottom portion 22 closes one of two openings of the cylindrical portion 21. The other opening of the cylindrical portion 21 is left open. The cover portion 23 is connected with the cylindrical portion 21 in a manner of closing the opening of the cylindrical portion 21. Therefore, a cavity in the cylindrical portion 21 forms a closed space. The cavity of the cylindrical portion 21 serves as the storage space of the case 12. The cover portion 23 includes a hole 23a to partially expose the lead 14 from the storage space.

The storage space includes a vibration-proof portion 17 in addition to the ultrasonic element 11. The vibration-proof portion 17 is made of an elastic resin material or a rubber material. The material includes nitrile rubber, for example.

In the storage space, the ultrasonic element 11 is positioned toward the bottom portion 22. The vibration-proof portion 17 is positioned toward the cover portion 23. When the cover portion 23 is fastened to the cylindrical portion 21, the vibration-proof portion 17 is pressed between the ultrasonic element 11 and the cover portion 23. The vibration-proof portion 17 is elastically deformed in the x-direction. The vibration-proof portion 17 generates a restoring force in the x-direction. The restoring force places the contact face 11a of the ultrasonic element 11 in contact with an inner face 22a of the bottom portion 22. The vibration-proof portion 17 comes in contact with the cover portion 23.

The transmission circuit 40 supplies a drive signal that causes the ultrasonic element 11 to generate an ultrasonic wave. The ultrasonic element 11 then vibrates in the x-direction in which the contact face 11a and the reverse face 11b are placed. The vibration also vibrates the bottom portion 22 of the case 12 in the x-direction while the bottom portion 22 is placed in contact with the ultrasonic element 11. The vibration is applied to the fuel 210 in contact with an outer face 22b of the bottom portion 22. The fuel 210 generates an ultrasonic wave.

Suppose an externally applied vibration vibrates the bottom portion 22. Then, the ultrasonic element 11 is pressed between the bottom portion 22 and the vibration-proof portion 17 in the x-direction. The ultrasonic element 11 generates a voltage. The voltage corresponding to the applied vibration is used as a signal to receive the ultrasonic wave and is input to the receiver circuit 50.

A reverberating vibration remains in the ultrasonic element 11 after generating the ultrasonic wave. The vibration-proof portion 17 prevents the reverberating vibration from occurring. The vibration-proof portion 17 also prevents the ultrasonic wave generated from the ultrasonic element 11 from leaking outside the storage space of the case 12 via the cover portion 23.

Transmission Pipe

The transmission pipe 30 causes an ultrasonic wave output from the ultrasonic sensor 10 to propagate to the liquid level 210a of the fuel 210. The transmission pipe 30 provides a path (propagation path) that causes the ultrasonic wave reflecting off the liquid level 210a to propagate to the ultrasonic element 11 again.

The transmission pipe 30 includes a horizontal pipe 31, a vertical pipe 32, and a reflective plate 33 as members to configure the propagation path. The transmission pipe 30 also includes a housing 34 that connects the members of the propagation path with the case 12 of the ultrasonic sensor 10.

The horizontal pipe 31 and the vertical pipe 32 are made of a metal material such as aluminum die-casting alloy. The horizontal pipe 31 communicates with the vertical pipe 32 through respective cavities. The case 12 is provided at one of two openings of the horizontal pipe 31. The vertical pipe 32 is connected with the other opening of the horizontal pipe 31. The horizontal pipe 31 and the vertical pipe 32 may be made of an insulating resin material. The other opening of the horizontal pipe 31 corresponds to the distal end of a reference pipe.

The horizontal pipe 31 is provided at the bottom face 200a of the fuel tank 200. The horizontal pipe 31 includes a communicating hole (unshown) opened toward the bottom face 200a. The fuel 210 enters the cavity of the horizontal pipe 31 through the communicating hole. The fuel 210 enters the cavity of the vertical pipe 32 communicating with the cavity of the horizontal pipe 31.

As illustrated in FIG. 1, the horizontal pipe 31 extends in the x-direction. The inner diameter of the horizontal pipe 31 is tapered from one of the two openings to the other. The bottom portion 22 of the case 12 is provided at one of the two openings of the horizontal pipe 31. The outer face 22b of the bottom portion 22 closes the same end.

The vicinity of the other of the two openings of the horizontal pipe 31 includes a part to steeply taper the inner diameter. A reference plane 31a is formed circularly around the axial direction (x-direction) of the horizontal pipe 31 near the other one of the two openings of the horizontal pipe 31.

The reference plane 31a is opposite to the outer face 22b of the case 12 in the x-direction while the outer face 22b closes one of the two openings of the horizontal pipe 31. Reference distance L1 as a predetermined length specifies a distance between the reference plane 31a and the contact face 11a of the ultrasonic element 11 in the x-direction.

When the ultrasonic element 11 generates an ultrasonic wave in the above-described configuration, the ultrasonic wave propagates from one end of the horizontal pipe 31 to the other end. The ultrasonic wave partially reflects off the reference plane 31a. The reflected ultrasonic wave (reference wave) enters the outer face 22b of the ultrasonic sensor 10. Then, the ultrasonic element 11 vibrates. The ultrasonic element 11 generates a reception signal based on the reference wave.

As above, reference distance L1 is defined as the predetermined length. Therefore, it is possible to find propagation velocity v of an ultrasonic wave propagating through the fuel 210 based on reference distance L1 and reference time t01 elapsed after the ultrasonic wave is output until the reference wave returns to the ultrasonic element 11. This is formulated as $v=2L1/t01$. The horizontal pipe 31 includes the part between the reference plane 31a and one end of the two openings of the horizontal pipe 31. This part is comparable to the reference pipe.

The vertical pipe 32 extends in the z-direction. One end of the vertical pipe 32 connects with the other end of the horizontal pipe 31. The other end of the vertical pipe 32 is positioned toward the top face 200b. The inner diameter of the vertical pipe 32 is equal to the inner diameter of the other end of the horizontal pipe 31. The vertical pipe 32 is comparable to a detection pipe.

The length of the vertical pipe 32 in the z-direction is configured so that the other end protrudes from the liquid level 210a toward the top face 200b when the fuel 210 is filled up in the fuel tank 200. The fuel 210 inside the cavity of the vertical pipe 32 and the fuel 210 outside the same maintain the same liquid level 210a.

The reflective plate 33 is made of a metal material such as a ferrous metal or stainless steel plate. The reflective plate 33 is provided between the horizontal pipe 31 and the vertical pipe 32. The reflective plate 33 includes a reflective surface 33a connecting with inside wall surfaces that compart the cavities of the horizontal pipe 31 and the vertical pipe 32. The reflective surface 33a and the inside wall surfaces of the horizontal pipe 31 and the vertical pipe 32 compart the propagation path of the transmission pipe 30.

The reflective plate 33 is formed into a sheet. The reflective plate 33 tilts approximately 45 degrees against the bottom face 200a of the fuel tank 200. The reflective surface 33a of the reflective plate 33 is positioned opposite to the outer face 22b of the ultrasonic sensor 10 in the x-direction through the intermediation of the fuel 210 filled in the cavity of the horizontal pipe 31. The reflective surface 33a is positioned opposite to the liquid level 210a in the z-direction through the intermediation of the fuel 210 filled in the cavity of the vertical pipe 32.

When the ultrasonic sensor 10 generates an ultrasonic wave, the ultrasonic wave propagates toward the reflective plate 33 positioned between the horizontal pipe 31 and the vertical pipe 32. The ultrasonic wave partially enters the reflective surface 33a of the reflective plate 33 and reflects off toward the liquid level 210a. The ultrasonic wave partially enters the liquid level 210a and reflects. The ultrasonic wave (liquid level wave) reflecting off the liquid level 210a partially propagates toward the reflective plate 33 and enters the reflective surface 33a. The liquid level wave entering the reflective surface 33a partially reflects and propagates toward the ultrasonic sensor 10. The ultrasonic wave then enters the outer face 22b of the ultrasonic sensor 10. The ultrasonic element 11 generates a reception signal based on the liquid level wave.

As above, propagation velocity v of the ultrasonic wave can be found based on the reference wave. Therefore, it is possible to find propagation path length L2 based on propagation velocity v and propagation path time t02 elapsed after the ultrasonic wave is output until the liquid level wave returns to the ultrasonic element 11. This is formulated as L2=v×t02/2.

The housing 34 is made of a resin material excellent in the stability concerning the fuel 210. The housing 34 covers surfaces of the horizontal pipe 31, part of the vertical pipe 32 toward the horizontal pipe 31, and the cylindrical portion 21. The housing 34 fastens the ultrasonic sensor 10 to the horizontal pipe 31.

Transmission Circuit

The transmission circuit 40 includes a drive circuit 41 and an impedance-matching circuit 42. The drive circuit 41 includes a switch provided between a power supply and the ground. The impedance-matching circuit 42 includes a diode provided between the power supply and the switch. A cathode electrode of the diode is connected to the power supply. The impedance-matching circuit 42 includes a primary pulse transformer and a secondary pulse transformer. The primary pulse transformer is connected to the diode in parallel. The secondary pulse transformer is magnetically coupled with the primary pulse transformer. The lead wire 16 is connected to both ends of the secondary pulse transformer.

A control signal supplied from the control circuit 60 controls a switch element to open and close. When the switch element changes from the open state to the closed state, an electric current as a drive signal is applied to the pulse transformer. A voltage is then applied to the ultrasonic element 11 via the lead wire 16.

Receiver Circuit

The receiver circuit 50 includes an amplifier circuit 51, a detector circuit 52, and a comparator circuit 53. The amplifier circuit 51 connects with the two lead wires 16 connected to both ends of the above-described secondary pulse transformer. Therefore, the amplifier circuit 51 is supplied with a drive signal (transmission signal) supplied to the ultrasonic element 11 from the transmission circuit 40 and a reception signal supplied from the ultrasonic element 11.

The amplifier circuit 51 amplifies the transmission signal and the reception signal. The amplifier circuit 51 outputs the amplified transmission and reception signals (amplified signals) to the detector circuit 52.

The detector circuit 52 applies half-wave rectification to the amplified signals and generates a detection signal by concatenating peaks of the half-wave rectified signals. The detector circuit 52 outputs the detection signal to the comparator circuit 53.

The comparator circuit 53 compares the detection signal with a threshold value. The comparator circuit 53 generates a comparison signal that goes high corresponding to a detection signal larger than the threshold value and goes low corresponding to a detection signal smaller than the threshold value. The comparator circuit 53 outputs the comparator circuit 53 to the control circuit 60. The comparator circuit 53 may generate a comparison signal that goes low corresponding to a detection signal larger than the threshold value and goes high corresponding to a detection signal smaller than the threshold value. The comparison signal is comparable to a detected signal.

Control Circuit

The control circuit 60 includes an arithmetic circuit 61, a timer 62, and memory 63. The arithmetic circuit 61 periodically performs an elapsed-time detection process, a propagation velocity detection process, and a propagation path detection process (to be described) at an interval of 100 ms, for example. When an ignition switch of the vehicle changes from off to on, the arithmetic circuit 61 performs the elapsed-time detection process, the propagation velocity detection process, and the propagation path detection process as event processes. The arithmetic circuit 61 is comparable to a first arithmetic circuit, a second arithmetic circuit, and a period circuit. The memory 63 is comparable to a storage unit.

Figure 4:
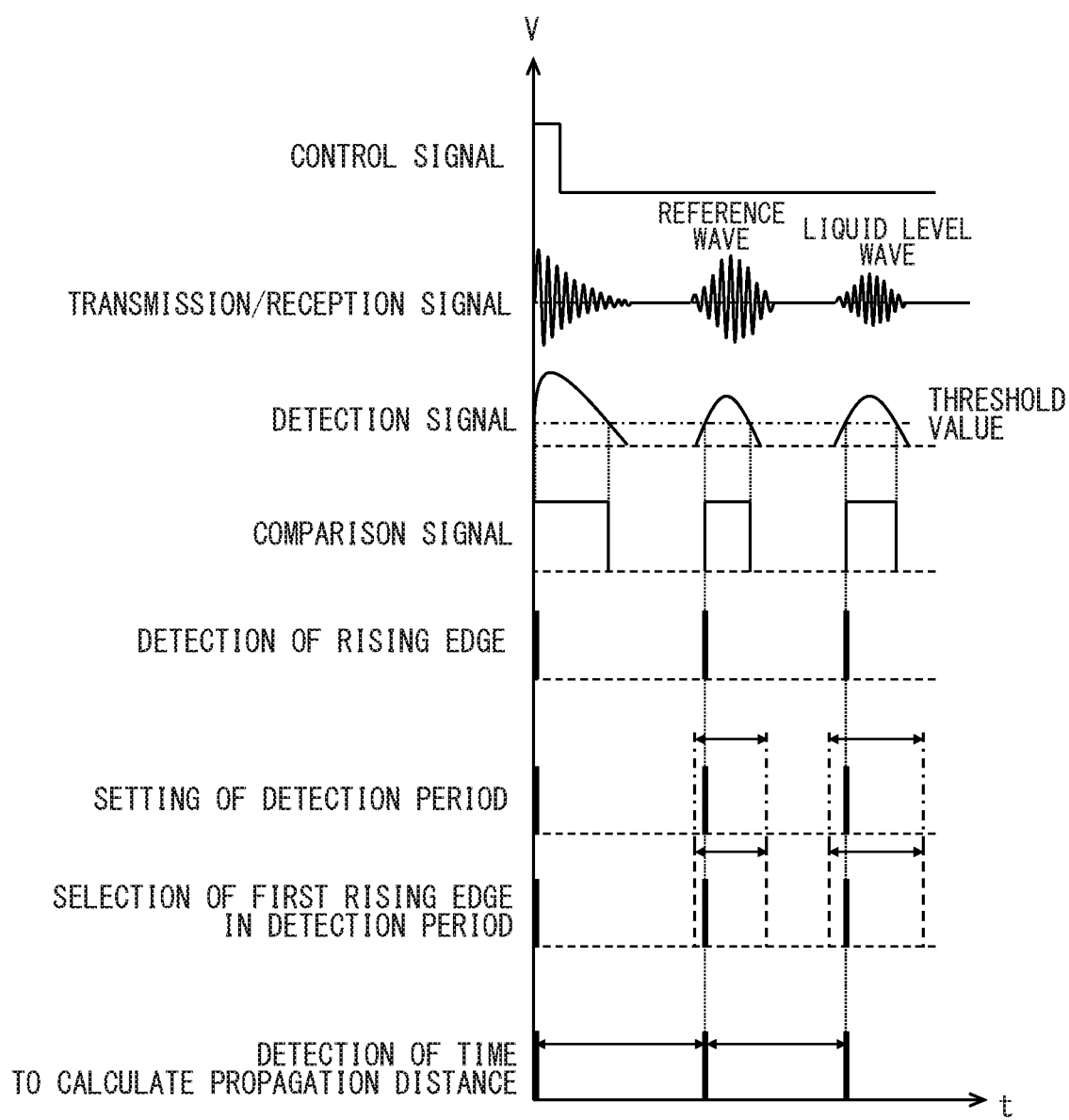
FIG. 4 is a timing chart illustrating a signal process.

The arithmetic circuit 61 outputs a control signal illustrated in FIG. 4 to the transmission circuit 40. When receiving the control signal, the transmission circuit 40 outputs a drive signal to the ultrasonic element 11. Supplied with the drive signal, the ultrasonic sensor 10 outputs an ultrasonic wave to the fuel 210 in the transmission pipe 30. The ultrasonic wave partially reflects off the reference plane 31a and returns as the reference wave to the ultrasonic sensor 10. The ultrasonic wave propagating through the fuel 210 in the transmission pipe 30 partially reflects off the liquid level 210a and returns as the liquid level wave to the ultrasonic sensor 10.

When receiving the ultrasonic wave, the ultrasonic sensor 10 converts the ultrasonic wave into a voltage to generate an electric signal (reception signal). The ultrasonic sensor 10 outputs the reception signal to the receiver circuit 50.

When supplied with the reception signal, the receiver circuit 50 amplifies the reception signal and converts it into a detection signal. The receiver circuit 50 compares the detection signal with a threshold value to generate a comparison signal. The receiver circuit 50 outputs the comparison signal to the arithmetic circuit 61.

As above, the drive signal is input to the receiver circuit 50 in addition to the ultrasonic sensor 10. Therefore, the receiver circuit 50 converts the drive signal into a detection signal to generate a comparison signal before converting the reception signal into a detection signal to generate a comparison signal. The receiver circuit 50 also outputs the comparison signal based on the drive signal to the arithmetic circuit 61.

The arithmetic circuit 61 detects timings (rising edges) at which voltage levels of the input comparison signals rise from low to high. The arithmetic circuit 61 identifies the first detected rising edge as the timing to output the ultrasonic wave from the ultrasonic sensor 10 in response to the input of the drive signal to the ultrasonic sensor 10.

The arithmetic circuit 61 computes a time difference between the rising edge and a rising edge to be detected later based on the time measured by the timer 62. The arithmetic circuit 61 computes the time elapsed until the ultrasonic wave output from the ultrasonic sensor 10 returns to the ultrasonic sensor 10. The arithmetic circuit 61 stores the elapsed time in the memory 63.

The number of rising edges

As illustrated in FIG. 4, for example, the ultrasonic sensor 10 outputs an ultrasonic wave and then is expected to receive two ultrasonic waves, namely, the reference wave reflecting off the reference plane 31a and the liquid level wave reflecting off the liquid level 210a. Therefore, the arithmetic circuit 61 is expected to detect two rising edges except a rising edge based on the drive signal. Of the two rising edges, the rising edge based on the reference wave is expected to be detected in a short time. The rising edge based on the liquid level wave is expected to be detected in a long time.

Figure 5:
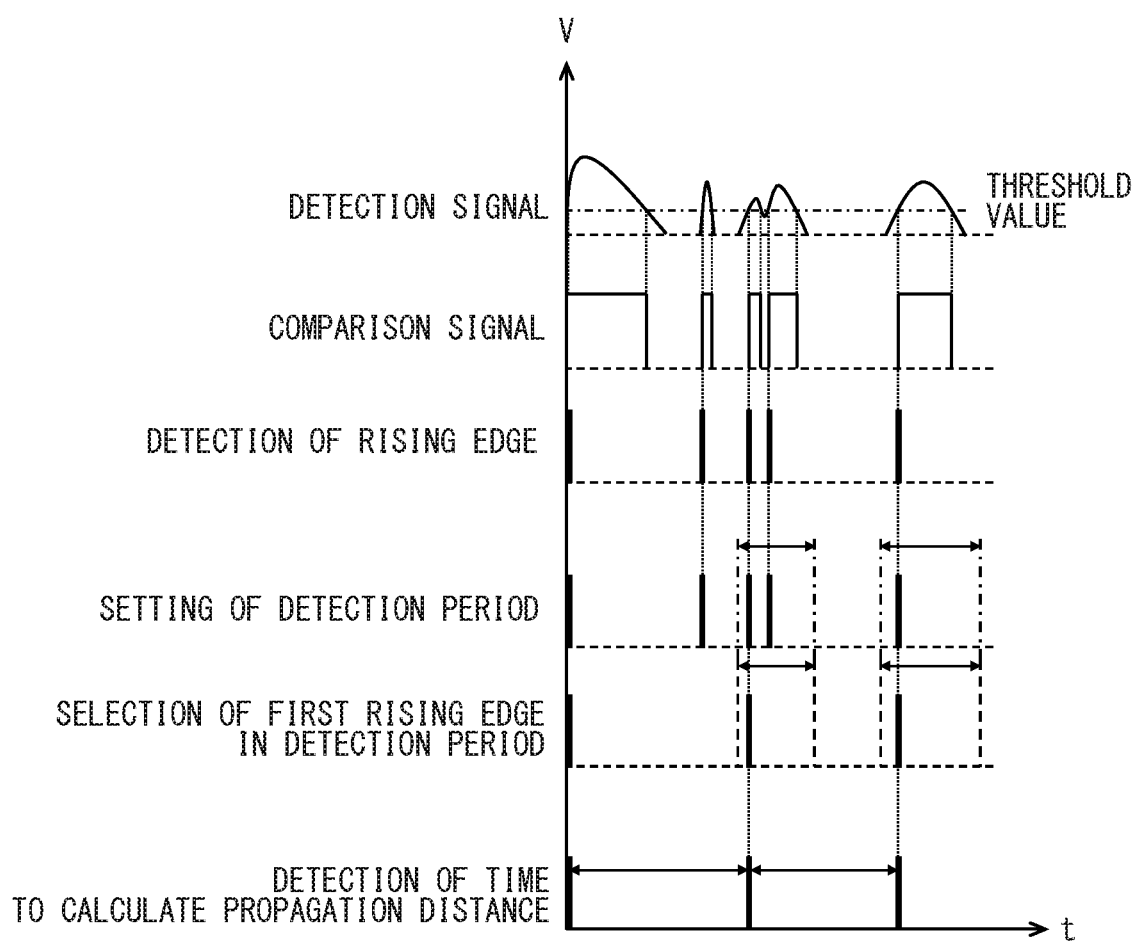
FIG. 5 is a timing chart illustrating a signal process when a noise occurs.

However, as illustrated in FIG. 5, for example, noise may overlap the detection signal. In this case, more than two rising edges are detected. In FIG. 5, four rising edges are detected. Therefore, it is impossible to determine which rising edges are based on the reference wave and the liquid level wave.

To solve this issue, the arithmetic circuit 61 is assigned with a reference detection period to detect a rising edge based on the reference wave. The arithmetic circuit 61 is assigned with a propagation path detection period to detect a rising edge based on the liquid level wave.

Figure 6:
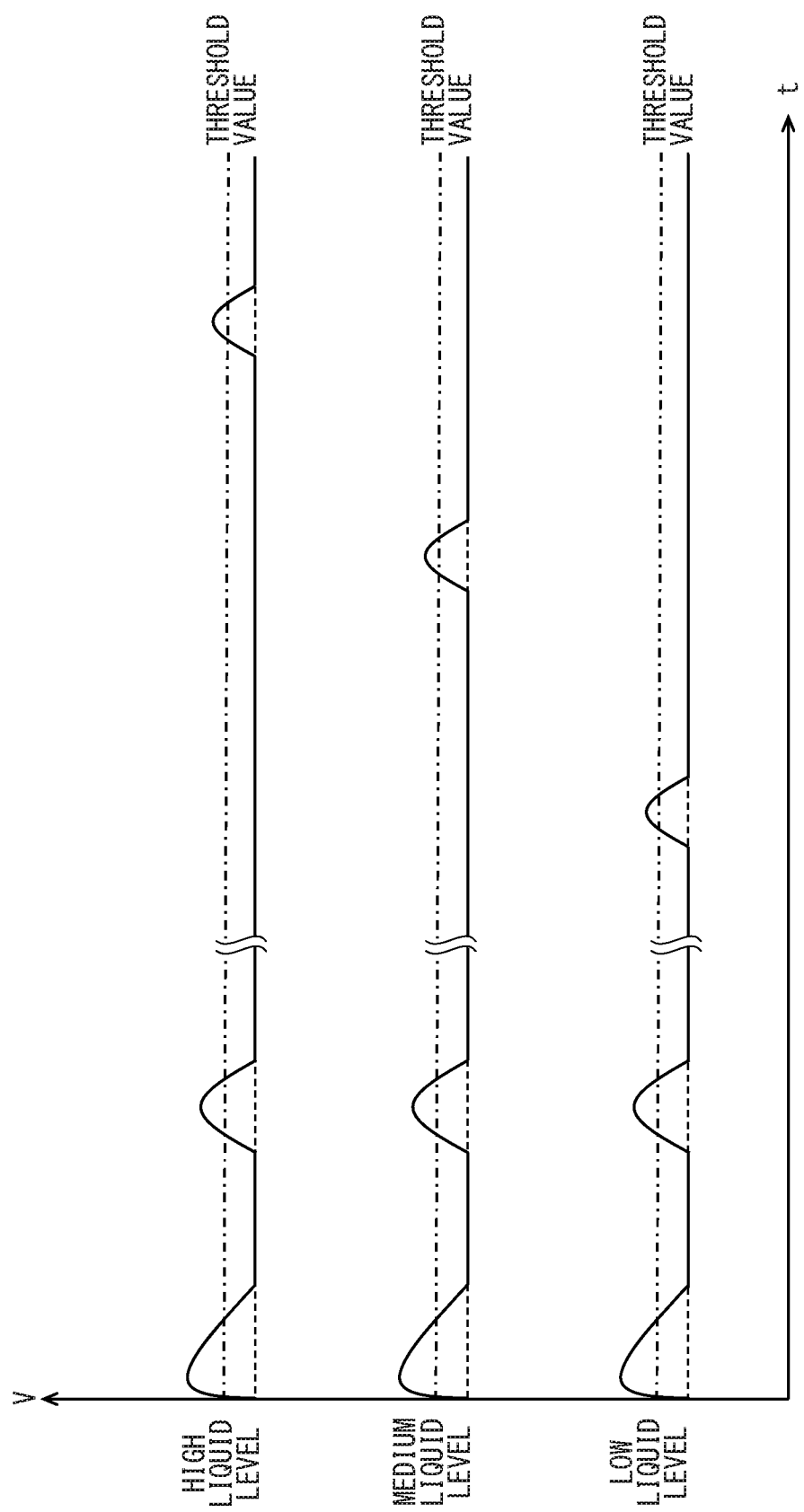
FIG. 6 is a timing chart illustrating a detection signal under the condition that a propagation velocity is constant and a liquid level changes.

The position of the liquid level 210a varies with the amount of the fuel 210 reserved in the fuel tank 200. The position of the liquid level 210a varies the timing at which the liquid level wave is detected even if the ultrasonic wave keeps propagation velocity v constant as illustrated in FIG. 6, for example.

Figure 9:
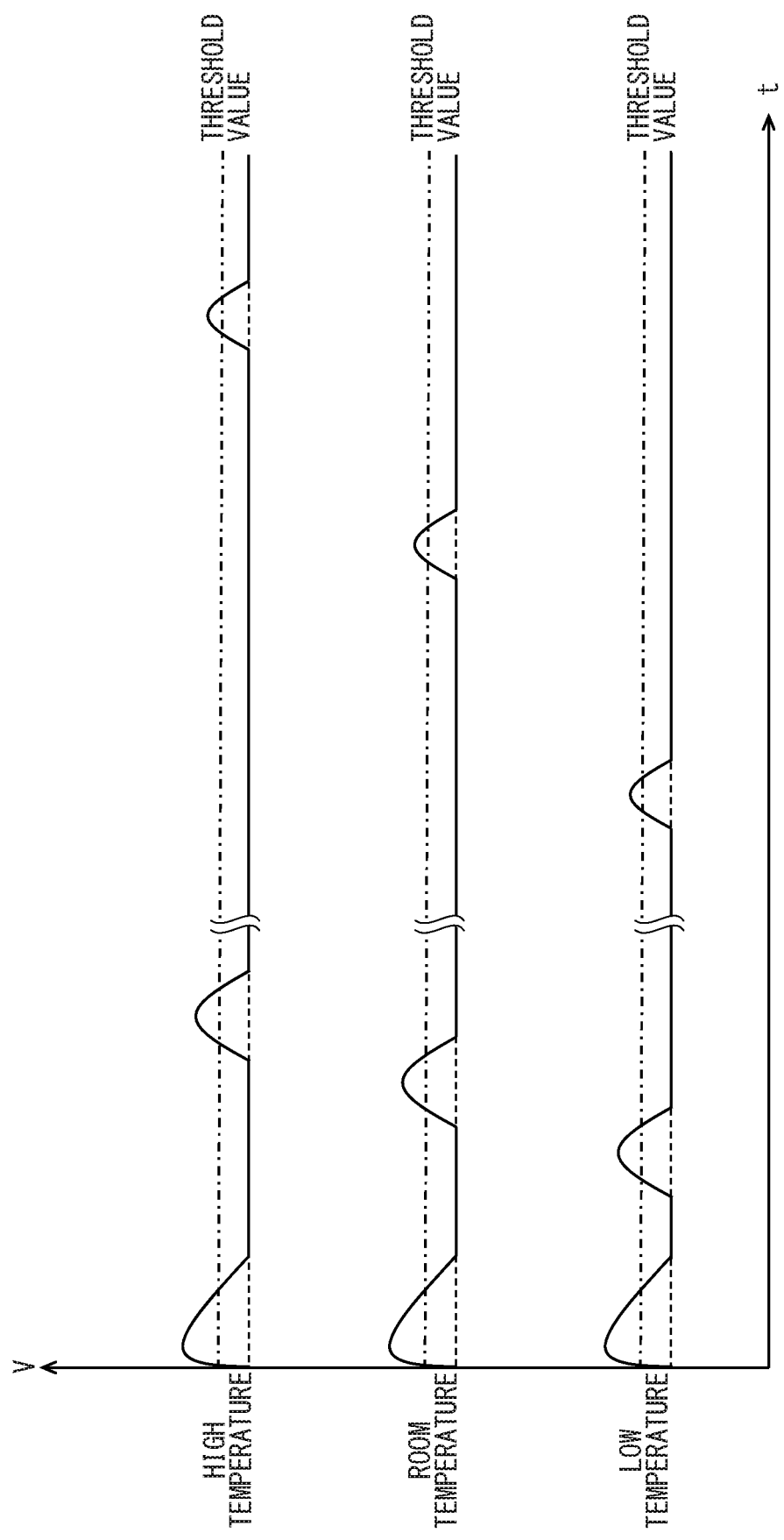
FIG. 9 is a timing chart illustrating a detection signal under the condition that a liquid level is constant and the fuel temperature changes.

Propagation velocity v of the ultrasonic wave varies with the temperature. As illustrated in FIG. 9, for example, the temperature of the fuel 210 varies the timing to detect the reference wave and the liquid level wave.

As above, the position of the liquid level 210a and a change in propagation velocity v vary the timing to detect the reference wave and the liquid level wave. Nevertheless, the arithmetic circuit 61 provides the reference detection period and the propagation path detection period that enable to detect the reference wave and liquid level wave and that eliminate noises.

Reference Detection Period

Reference time t01 elapses after the ultrasonic sensor 10 outputs an ultrasonic wave until the reference wave reflecting off the reference plane 31a returns to the ultrasonic sensor 10. Reference time t01 depends on reference distance L1 and propagation velocity v of the ultrasonic wave. Reference distance L1 is constant. Therefore, reference time t01 varies with propagation velocity v.

Reference time t01 is longest when propagation velocity v is lowest. Reference time t01 is shortest when propagation velocity v is highest. It is expected that a rising edge based on the reference wave is detected at the timing between the shortest reference time t01 and the longest reference time t01. However, a rising edge may be detected during a period except the time between the shortest reference time t01 and the longest reference time t01. Then, it is supposed that the rising edge is not based on the reference wave.

Temperature-dependent properties of propagation velocity v of the ultrasonic wave depend on compositions of the fuel 210 where the ultrasonic wave propagates. The fuel 210 according to the present embodiment increases propagation velocity v as the temperature lowers. Therefore, the highest propagation velocity v described above corresponds to the lowest operating ambient temperature for the ultrasonic distance measuring device 100 (ultrasonic element 11). The lowest propagation velocity v corresponds to the highest operating ambient temperature.

To simplify the description below, highest propagation velocity vh denotes a propagation velocity at the lowest operating ambient temperature and lowest propagation velocity vl denotes a propagation velocity at the highest operating ambient temperature. Highest propagation velocity vh and lowest propagation velocity vl are in advance stored in the memory 63. Highest propagation velocity vh is comparable to a first velocity. Lowest propagation velocity vl is comparable to a second velocity Highest propagation velocity vh stored in the memory 63 may be slightly higher than the propagation velocity of an ultrasonic wave propagating through the fuel 210 at the lowest operating ambient temperature. Similarly, lowest propagation velocity vl stored in the memory may be slightly lower than the propagation velocity of an ultrasonic wave propagating through the fuel 210 at the highest operating ambient temperature.

Figure 7:
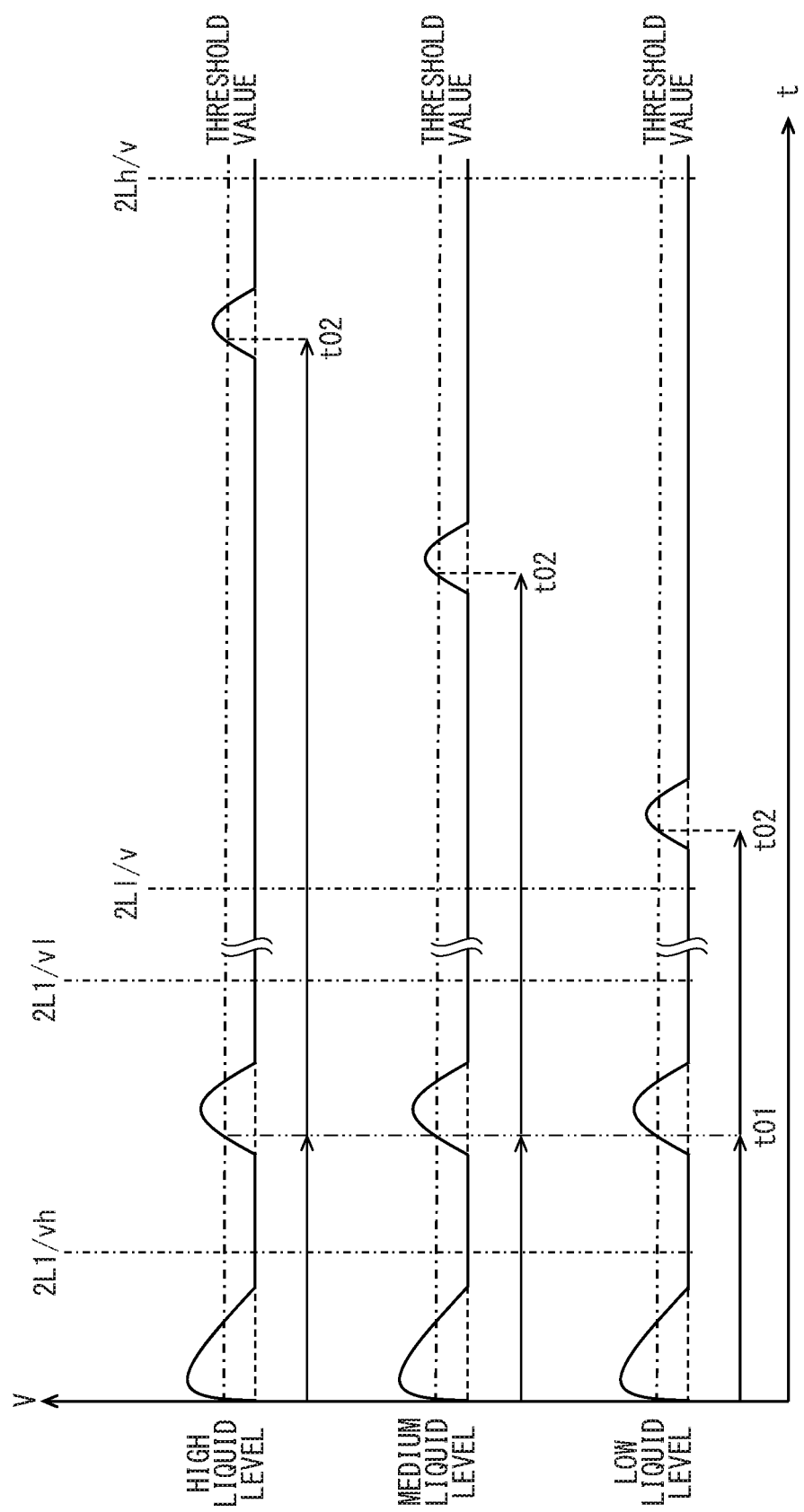
FIG. 7 is a timing chart illustrating a mode of setting detection periods.
Figure 10:
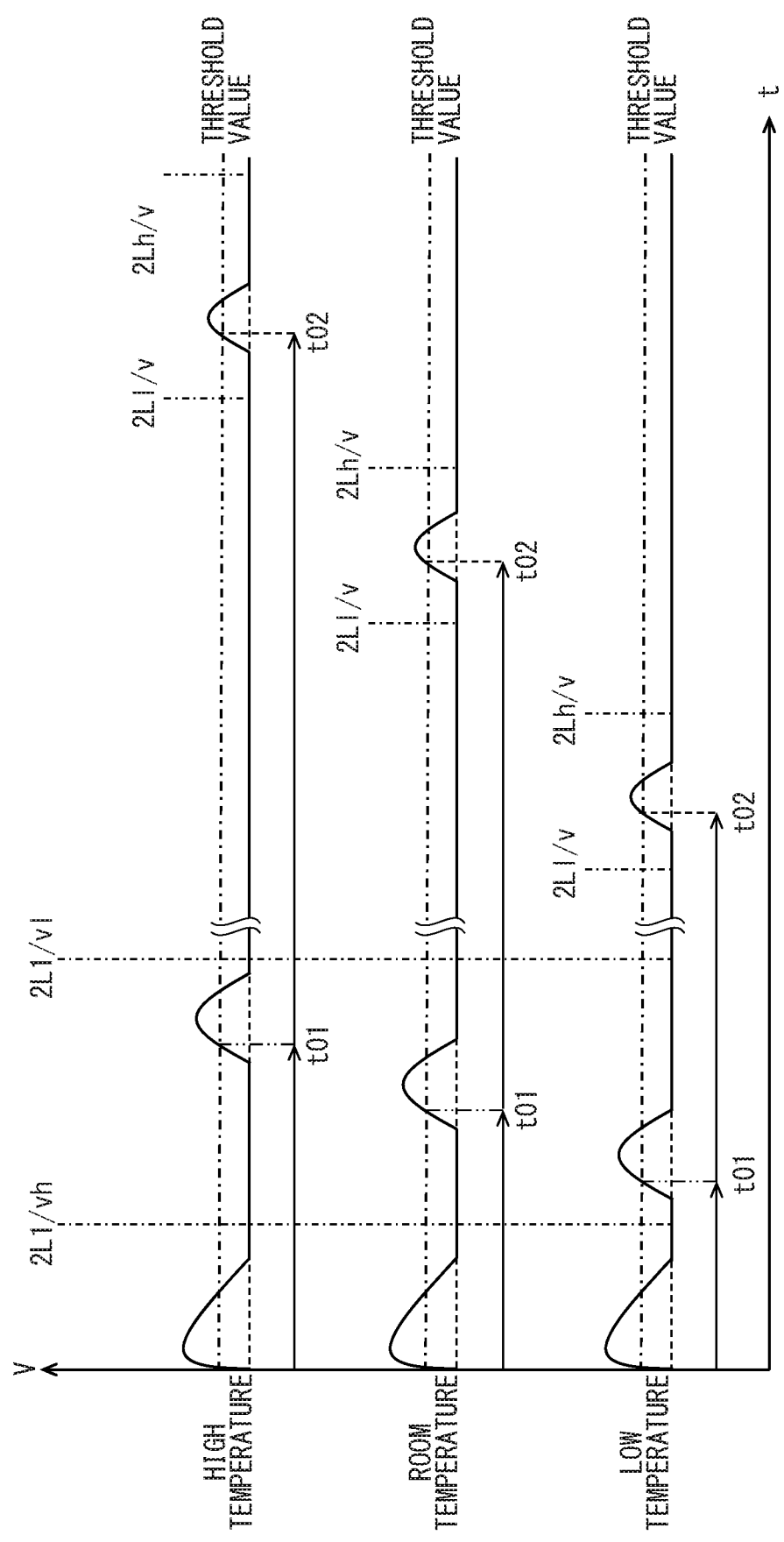
FIG. 10 is a timing chart illustrating a mode of setting detection periods.

Initially, the arithmetic circuit 61 defines the lower limit and the upper limit for the reference detection period based on reference distance L1, highest propagation velocity vh, and lowest propagation velocity v as illustrated in FIGS. 7 and 10, for example. The lower limit for the reference detection period is formulated as 2L1/vh. The upper limit for the reference detection period is formulated as 2L1/vl.

The arithmetic circuit 61 detects the rising edge of a comparison signal that is input during the reference detection period. The arithmetic circuit 61 computes a time difference between the detected rising edge and a rising edge first detected during the period before the reference detection period. The time difference is assumed to be reference time t01. The arithmetic circuit 61 stores the computed reference time t01 in the memory 63. The timing to raise the rising edge first detected during the period before the reference detection period is comparable to an output timing. A time difference between the detected rising edge and a rising edge first detected during the period before the reference detection period is comparable to a first time difference.

As illustrated in FIG. 5, for example, noise may cause a plurality of rising edges to be detected during the reference detection period. In this case, the arithmetic circuit 61 selects a rising edge detected in the shortest time during the reference detection period and assumes that rising edge to be the rising edge based on the reference wave. The timing to raise the rising edge based on the reference wave is comparable to a reference timing.

The arithmetic circuit 61 computes propagation velocity v of an ultrasonic wave based on reference time t01 and reference distance L1 computed above.

Propagation velocity v is formulated as v=2L1/t01. The arithmetic circuit 61 stores the computed propagation velocity v in the memory 63.

When the reference detection period is set again, the memory 63 stores reference time t01 that is computed during the process to set the previous reference detection period. The memory 63 in advance stores the correlation between propagation velocity v (fuel temperature) and waveform length Lw1 of the reference wave.

The "waveform length" does not denote a wavelength resulting from dividing the propagation velocity of an ultrasonic wave by the frequency. The waveform length applies to the length of the detection signal illustrated in FIG. 4, for example. The waveform length represents a length beyond the reference value such as a detection signal set to 0 V lower than the threshold value.

Figure 8:
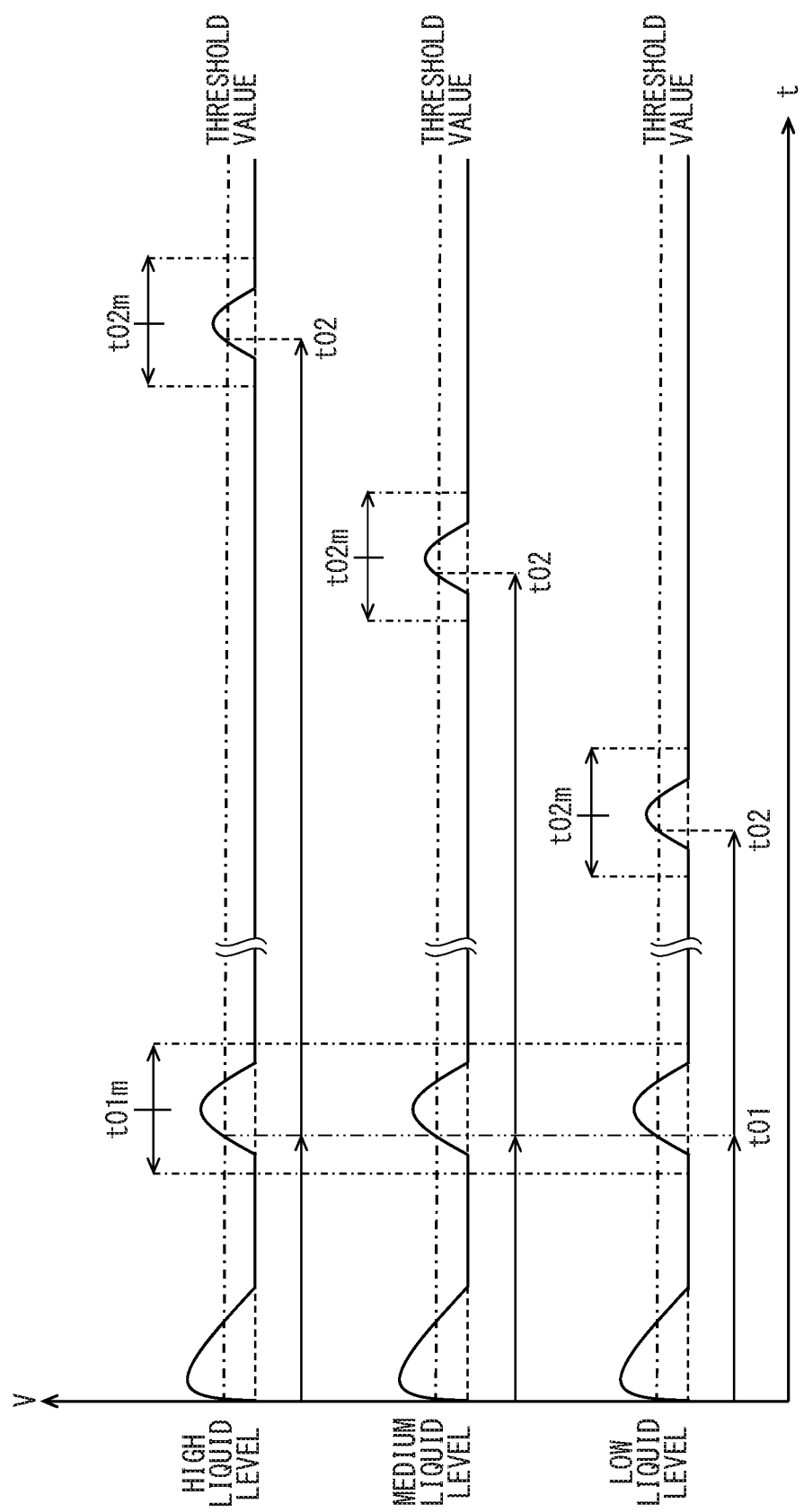
FIG. 8 is a timing chart illustrating a mode of updating detection periods.
Figure 11:
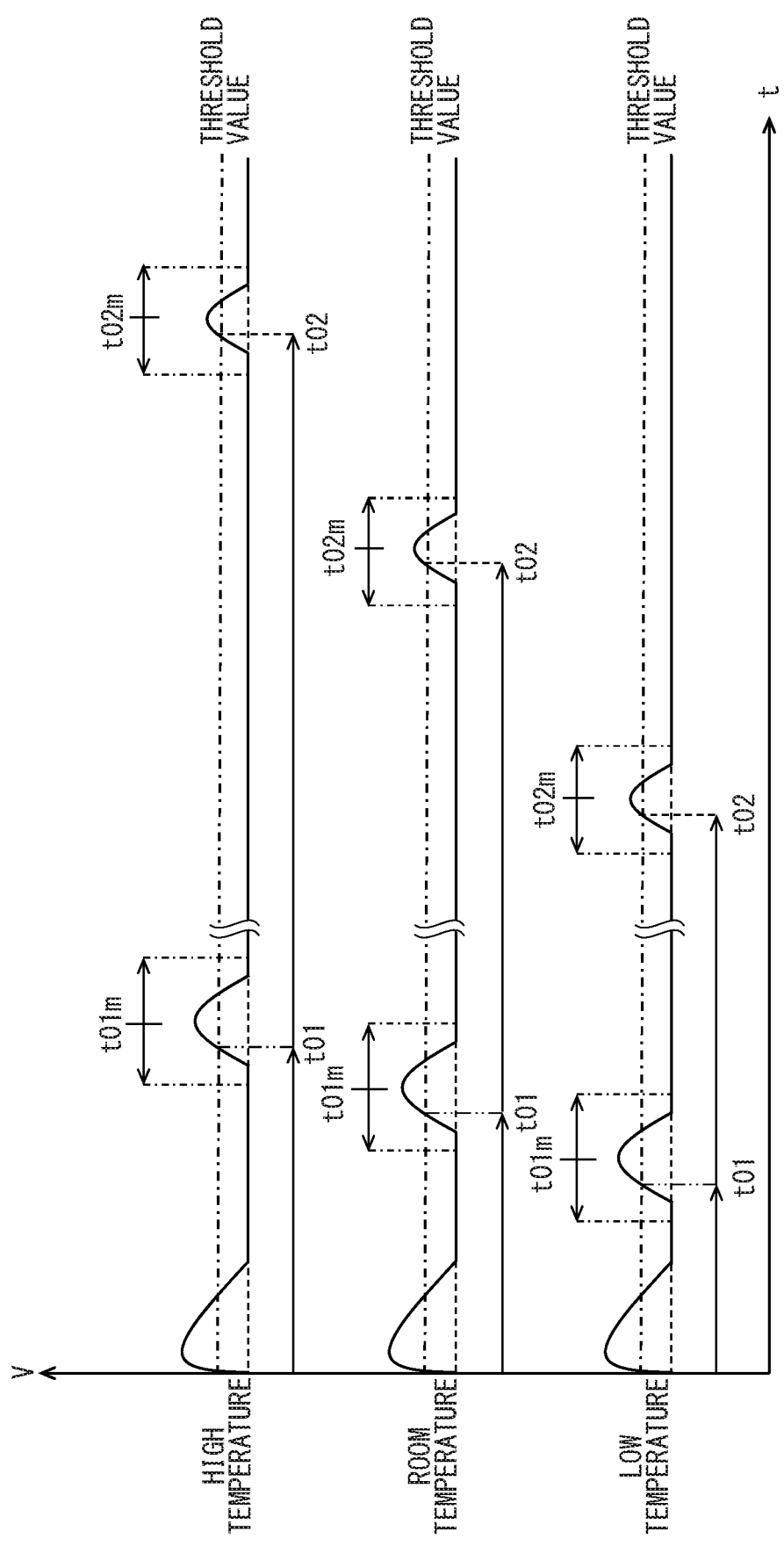
FIG. 11 is a timing chart illustrating a mode of updating detection periods.

From the correlation stored in the memory 63, the arithmetic circuit 61 reads waveform length Lw1 of the reference wave corresponding to propagation velocity v that is computed during the process to set the previous reference detection period. The arithmetic circuit 61 updates the reference detection period based on waveform length Lw1 of the read reference wave and reference time t01 stored in the memory 63. As illustrated in FIGS. 8 and 11, it is possible to appropriately shorten the reference detection period.

The lower limit of the updated reference detection period is formulated as t01−Lw1/2. The upper limit of the same is formulated as t01+Lw1/2. The center value of the updated reference detection period is set to reference time t01 stored in the memory 63. The width of the reference detection period is equal to waveform length Lw1 of the reference wave.

A detection signal based on the reference wave exceeds the threshold value before the detection signal reaches the peak value. Therefore, the center value of the reference detection period may be slightly later than reference time t01 stored in the memory 63. The width of the reference detection period may be set to a value resulting from multiplying Lw1 by a coefficient equal to 1 or greater. The memory 63 may store waveform length Lw1 of the reference wave as a fixed value. FIGS. 8 and 11 illustrate t01m representing the reference time stored in the memory 63.

Propagation Path Detection Period

Propagation path time t02 elapses after the ultrasonic sensor 10 outputs an ultrasonic wave until the liquid level wave reflecting off the liquid level 210a returns to the ultrasonic sensor 10. Propagation path time t02 depends on propagation path length L2 and propagation velocity v of the ultrasonic wave.

When propagation velocity v is constant, the shortest propagation path time t02 corresponds to the shortest propagation path length L2. The longest propagation path time t02 corresponds to the longest propagation path length L2. It is expected that a rising edge based on the liquid level wave is detected at the timing between the shortest propagation path time t02 and the longest propagation path time t02. However, a rising edge may be detected during a period except the time between the shortest propagation path time t02 and the longest propagation path time t02. Then, it is supposed that the rising edge does not correspond to a signal based on the liquid level wave.

Propagation path length L2 is shortest when the fuel 210 scarcely remains in the fuel tank 200. Propagation path length L2 is longest when the fuel 210 is filled up in the fuel tank 200. To simplify the description below, shortest propagation path length Ll denotes a propagation path length when the fuel 210 scarcely remains. Longest propagation path length Lh denotes a propagation path length when the fuel 210 is filled up. The memory 63 stores shortest propagation path length Ll and longest propagation path length Lh.

Shortest propagation path length Ll stored in the memory 63 may be slightly shorter than the propagation path length when the fuel 210 scarcely remains in the fuel tank 200. Similarly, longest propagation path length Lh stored in the memory 63 may be slightly longer than the propagation path length when the fuel 210 filled up in the fuel tank 200.

Initially, the arithmetic circuit 61 defines the lower limit and the upper limit for the propagation path detection period based on propagation velocity v, shortest propagation path length Ll, and longest propagation path length Lh stored in the memory 63 as illustrated in FIGS. 7 and 10, for example. The lower limit for the propagation path detection period is formulated as 2Ll/v. The upper limit for the propagation path detection period is formulated as 2Lh/v.

Propagation velocity v stored in the memory 63 is equal to propagation velocity v that is computed during the process to set the reference detection period. A timing chart in FIG. 7 illustrates that propagation velocity v of the ultrasonic wave is constant. Therefore, the propagation path detection period is unchanged even if the positions of the liquid level 210a differ. A timing chart in FIG. 10 illustrates that propagation velocity v of the ultrasonic wave varies. Therefore, the propagation path detection period varies with temperatures.

The arithmetic circuit 61 detects the rising edge of a comparison signal that is input during the propagation path detection period. The arithmetic circuit 61 computes a time difference between the detected rising edge and a rising edge first detected during the period before the reference detection period. The time difference is assumed to be propagation path time t02. The arithmetic circuit 61 stores the computed propagation path time t02 in the memory 63. A time difference between the detected rising edge of a comparison signal input during the propagation path detection period and a rising edge first detected during the period before the reference detection period is comparable to a second time difference.

Noise may cause a plurality of rising edges to be detected during the propagation path detection period. In this case, the arithmetic circuit 61 selects a rising edge detected in the shortest time during the propagation path detection period and assumes that rising edge to be the rising edge based on the liquid level wave. The timing to raise the rising edge based on the liquid level wave is comparable to a liquid level timing.

The arithmetic circuit 61 computes propagation path length L2 based on propagation path time t02 and propagation velocity v computed above. Propagation path length L2 is formulated as L2=v×t02/2. The arithmetic circuit 61 stores the computed propagation path length L2 in the memory 63.

When the propagation path detection period is set again, the memory 63 stores propagation path time t02 that is computed during the process to set the previous propagation path detection period. The memory 63 in advance stores the correlation between propagation velocity v (fuel temperature) and waveform length Lw2 of the liquid level wave. From the correlation stored in the memory 63, the arithmetic circuit 61 reads waveform length Lw2 of the liquid level wave corresponding to propagation velocity v that is computed during the process to set the reference detection period. The arithmetic circuit 61 updates the propagation path detection period based on the read waveform length Lw2 of the liquid level wave and propagation path time t02 stored in the memory 63. As illustrated in FIGS. 8 and 11, it is possible to appropriately shorten the propagation path detection period.

The lower limit of the updated propagation path detection period is formulated as t02−Lw2/2. The upper limit of the same is formulated as t02+Lw2/2. The center value of the updated propagation path detection period is set to propagation path time t02 stored in the memory 63. The width of the propagation path detection period is equal to waveform length Lw2 of the liquid level wave.

A detection signal based on the liquid level wave exceeds the threshold value before the detection signal reaches the peak value. Therefore, the center value of the propagation path detection period may be slightly later than propagation path time t02 stored in the memory 63. The width of the propagation path detection period may be set to a value resulting from multiplying Lw2 by a coefficient equal to 1 or greater. The memory 63 may store waveform length Lw2 of the liquid level wave as a fixed value. The memory 63 may store length Lw representing waveform lengths of the reference wave and the liquid level wave so that the waveform lengths are assumed to be the same. The memory 63 may store the waveform length of the ultrasonic wave reflecting off the propagation path as a fixed value. FIGS. 8 and 11 illustrate t02m representing the propagation path time stored in the memory 63.

Figure 12:
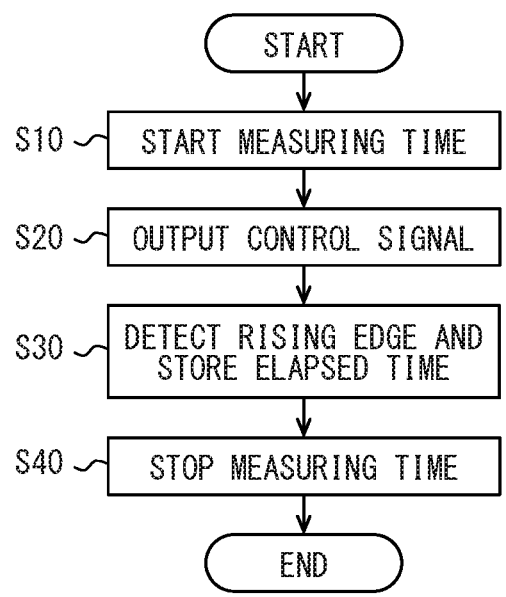
FIG. 12 is a flowchart illustrating an elapsed-time detection process.
Figure 13:
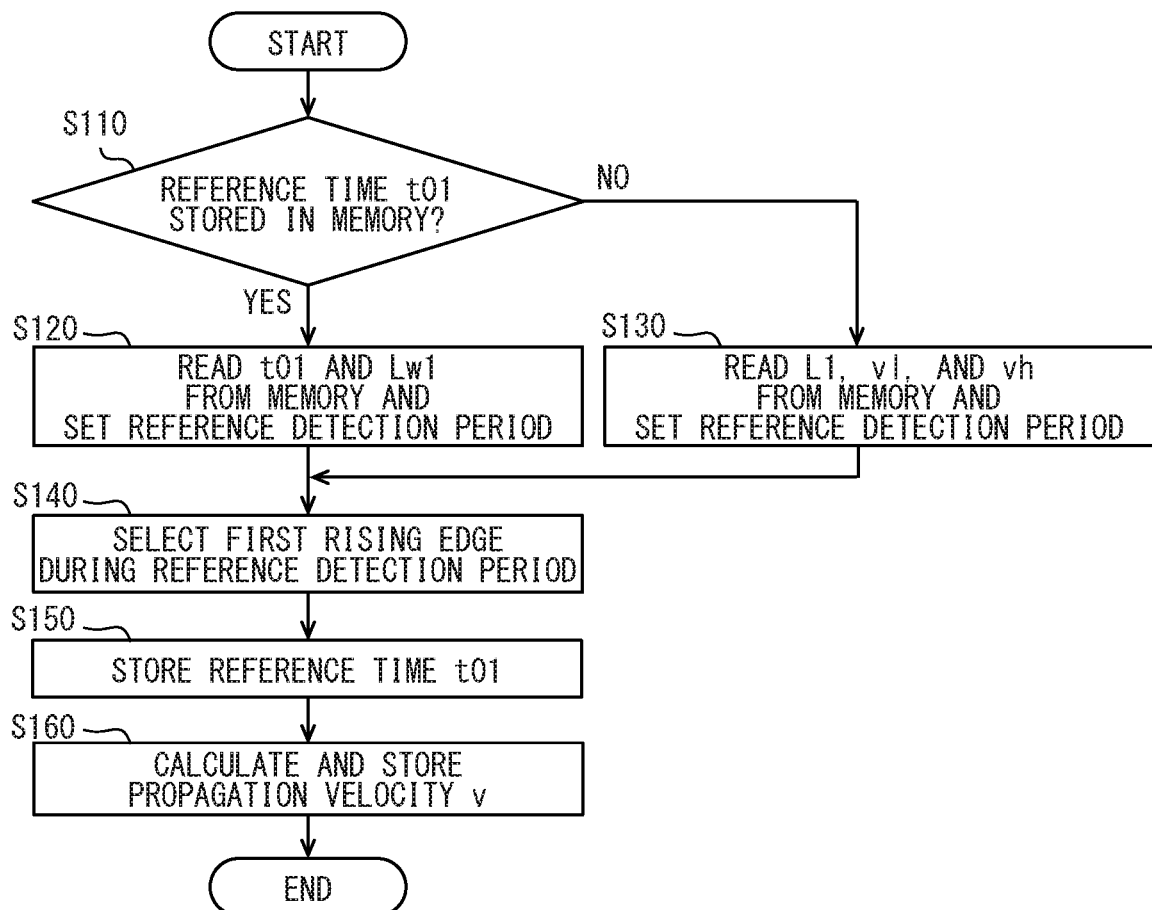
FIG. 13 is a flowchart illustrating a propagation velocity detection process.
Figure 14:
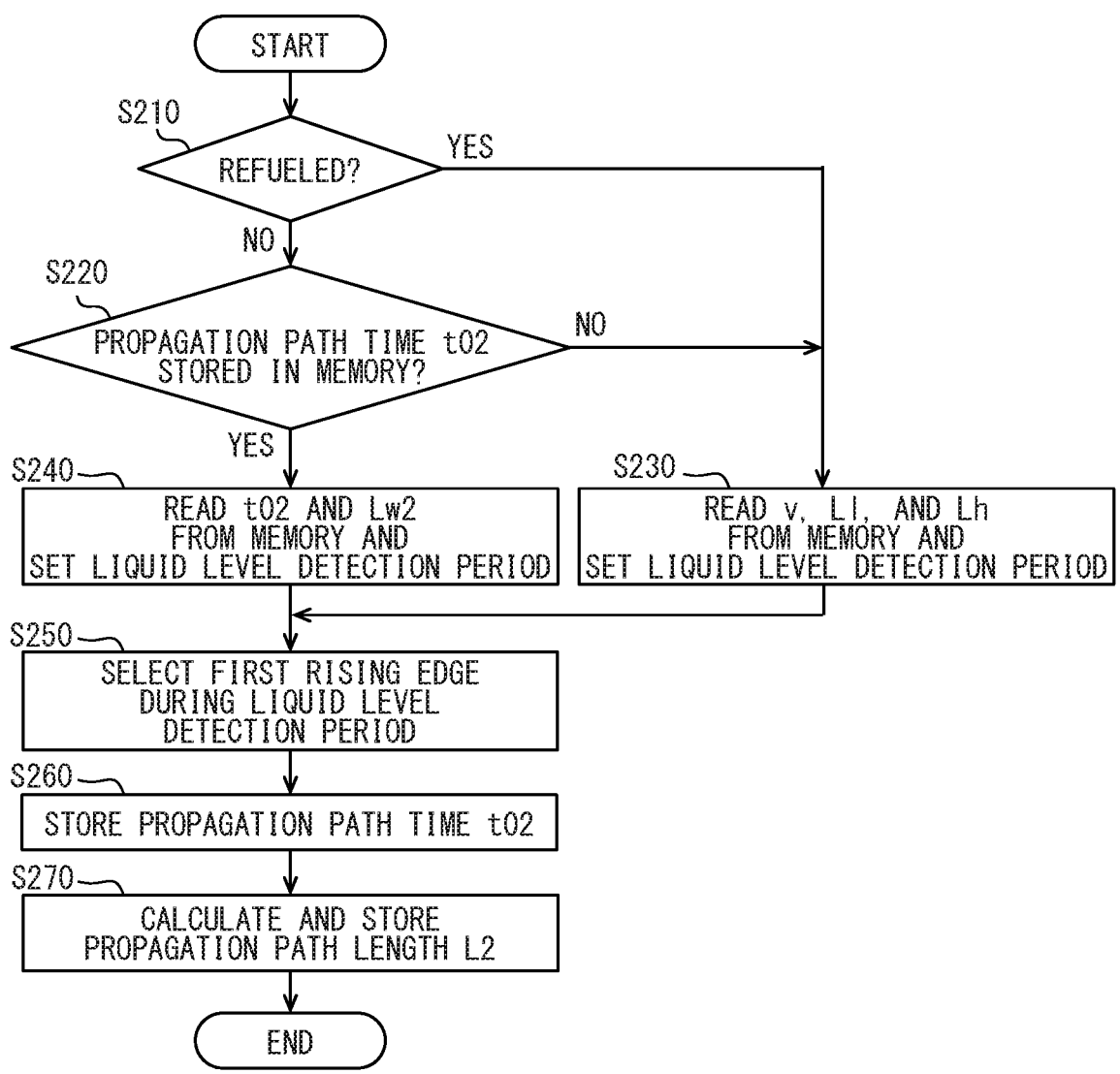
FIG. 14 is a flowchart illustrating a propagation path detection process.

With reference to FIGS. 12 through 14, the description below explains the elapsed-time detection process, the propagation velocity detection process, and the propagation path detection process of the arithmetic circuit 61.

Elapsed-Time Detection Process

FIG. 12 concisely illustrates the elapsed-time detection process. When an event task occurs periodically or accidentally, the arithmetic circuit 61 starts performing step S10 of FIG. 12. In step S10, the arithmetic circuit 61 starts measuring the time by using the timer 62.

In step S20, the arithmetic circuit 61 outputs a control signal to the transmission circuit 40. The receiver circuit 50 is then supplied with a drive signal and a reception signal. The arithmetic circuit 61 is supplied with a comparison signal based on these two types of signals.

In step S30, the arithmetic circuit 61 detects a rising edge of the input comparison signal. The arithmetic circuit 61 computes a time difference between the first detected rising edge and a rising edge to be detected later. The time difference is assumed to be an elapsed time until an ultrasonic wave output from the ultrasonic sensor 10 returns to the ultrasonic sensor 10. The arithmetic circuit 61 stores the elapsed time in the memory 63.

In step S40, the arithmetic circuit 61 stops measuring the time by using the timer 62. The timing to stop measuring the time is set to be later than the time when the liquid level wave is expected to return to the ultrasonic sensor 10 under the condition that propagation velocity v of an ultrasonic wave is lowest at the operating ambient temperature of the ultrasonic element 11 and the fuel 210 is filled up in the fuel tank 200. The elapsed-time detection process is performed as above.

Propagation Velocity Detection Process

FIG. 13 concisely illustrates the propagation velocity detection process. The arithmetic circuit 61 starts performing step S110 of FIG. 13 after terminating the elapsed-time detection process.

In step S110, the arithmetic circuit 61 determines whether the memory 63 stores reference time t01. If the memory 63 stores reference time t01, the arithmetic circuit 61 proceeds to step S120. If the memory 63 does not store reference time t01, the arithmetic circuit 61 proceeds to step S130.

In step S120, the arithmetic circuit 61 reads reference time t01 and waveform length Lw1 of the reference wave stored in the memory 63. The arithmetic circuit 61 computes lower limit t01−Lw1/2 and upper limit t01+Lw1/2 of the reference detection period. The arithmetic circuit 61 then proceeds to step S140.

In step S130, the arithmetic circuit 61 reads reference distance L1, lowest propagation velocity vl, and highest propagation velocity vh stored in the memory 63. The arithmetic circuit 61 computes lower limit 2L1/vh and upper limit 2L1/vl of the reference detection period. The arithmetic circuit 61 then proceeds to step S140.

Reference time t01 is not stored in the memory 63 when the arithmetic circuit 61 performs the propagation velocity detection process for the first time. The arithmetic circuit 61 performs step S130 instead of step S120 when performing the propagation velocity detection process for the first time. The arithmetic circuit 61 performs step S120 during the propagation velocity detection process to follow. Then, the reference detection period is updated. The reference detection period is shortened.

In step S140, the arithmetic circuit 61 selects a rising edge of the comparison signal input during the reference detection period. The arithmetic circuit 61 selects a rising edge closest to the lower limit of the reference detection period when the reference detection period includes a plurality of rising edges. The arithmetic circuit 61 then proceeds to step S150.

In step S150, the arithmetic circuit 61 causes the memory 63 to store the elapsed time corresponding to the rising edge selected in step S140 and assumes the elapsed time to be reference time t01. This elapsed time is already computed in step S30 of the elapsed-time detection process. The arithmetic circuit 61 then proceeds to step S160.

In step S160, the arithmetic circuit 61 reads the elapsed time (reference time t01) selected in step S150 and reference distance L1 from the memory 63. The arithmetic circuit 61 computes propagation velocity v=2L1/t01 of the ultrasonic wave. The arithmetic circuit 61 stores propagation velocity v in the memory 63. The propagation velocity detection process is performed as above.

Propagation Path Detection Process

FIG. 14 concisely illustrates the propagation path detection process. As illustrated in FIG. 3, the vehicle includes a refueling sensor 300 to determine whether the vehicle is refueled. The arithmetic circuit 61 starts performing step S210 of FIG. 14 after terminating the propagation velocity detection process.

In step S210, the arithmetic circuit 61 acquires an output from the refueling sensor 300. Based on the output, the arithmetic circuit 61 determines whether the fuel 210 is filled in the fuel tank 200. If no fuel is filled, the arithmetic circuit 61 proceeds to step S220. If the fuel is filled, the arithmetic circuit 61 proceeds to step S230.

In step S220, the arithmetic circuit 61 determines whether the memory 63 stores propagation path time t02. If the memory 63 stores propagation path time t02, the arithmetic circuit 61 proceeds to step S240. If the memory 63 does not store propagation path time t02, the arithmetic circuit 61 proceeds to step S230.

In step S240, the arithmetic circuit 61 reads propagation path time t02 and waveform length Lw2 of the liquid level wave stored in the memory 63. The arithmetic circuit 61 computes lower limit t02−Lw2/2 and upper limit t02+Lw2/2 for the propagation path detection period. The arithmetic circuit 61 then proceeds to step S250.

In step S230, the arithmetic circuit 61 reads propagation velocity v, shortest propagation path length Ll, and longest propagation path length Lh stored in the memory 63. The arithmetic circuit 61 computes lower limit 2Ll/v and upper limit 2Lh/v for the propagation path detection period. The arithmetic circuit 61 then proceeds to step S250.

Propagation path time t02 is not stored in the memory 63 when the arithmetic circuit 61 performs the propagation path detection process for the first time. The arithmetic circuit 61 performs step S230 instead of step S240 when performing the propagation path detection process for the first time. The arithmetic circuit 61 performs step S240 during the propagation path detection process to follow. Then, the propagation path detection period is updated. The propagation path detection period is shortened.

In step S250, the arithmetic circuit 61 selects a rising edge of the comparison signal input during the propagation path detection period. The arithmetic circuit 61 selects a rising edge closest to the lower limit of the propagation path detection period when the propagation path detection period includes a plurality of rising edges. The arithmetic circuit 61 then proceeds to step S260.

In step S260, the arithmetic circuit 61 causes the memory 63 to store the elapsed time corresponding to the rising edge selected in step S250 and assumes the elapsed time to be propagation path time t02. This elapsed time is already computed in step S30 of the elapsed-time detection process. The arithmetic circuit 61 then proceeds to step S270.

In step S270, the arithmetic circuit 61 reads the elapsed time (propagation path time t02) selected in step S250 and propagation velocity v from the memory 63. The arithmetic circuit 61 computes propagation path length $L2=v \times t02/2$. The arithmetic circuit 61 stores propagation path length L2 in the memory 63. The propagation path detection process is performed as above.

When the above-described processes detect propagation path length L2, the arithmetic circuit 61 computes the liquid level 210a in the z-direction based on propagation path length L2 and reference distance L1, for example. The arithmetic circuit 61 outputs data including the computed liquid level to a liquid level display device of the vehicle, for example.

Operation and Effect

The description below explains the operation and effect of the ultrasonic distance measuring device 100.

It is expected that an ultrasonic wave reflecting off the liquid level 210a returns to the ultrasonic element 11 at the timing between the longest propagation time and the shortest propagation time for the ultrasonic wave. However, a rising edge may be detected during a period except the period between the longest propagation time and the shortest propagation time. Then, it is supposed that the rising edge does not correspond to the position of the liquid level 210a.

As a solution, the ultrasonic distance measuring device 100 is assigned with the propagation path detection period to detect a rising edge corresponding to the liquid level wave based on shortest propagation path length Ll and longest propagation path length Lh of the propagation path for the ultrasonic wave; and propagation velocity v of the ultrasonic wave. The ultrasonic distance measuring device 100 computes propagation path length L2 based on the elapsed time (propagation path time t02) after the output of the ultrasonic wave corresponding to the rising edge during the propagation path detection period; and propagation velocity v of the ultrasonic wave.

In this way, it is possible to inhibit propagation path length L2 from being measured by the use of a signal not based on the position of the liquid level 210a. It is therefore possible to inhibit the distance measurement accuracy from degrading.

When the memory 63 stores propagation path time t02, the arithmetic circuit 61 updates the propagation path detection period based on propagation path time t02 and waveform length Lw2 of the liquid level wave. This shortens the propagation path detection period. It is possible to more effectively inhibit propagation path length L2 from being measured through the use of a signal not based on the position of the liquid level 210a.

The memory 63 in advance stores the correlation between propagation velocity v (fuel temperature) and waveform length Lw2 of the liquid level wave. From the correlation stored in the memory 63, the arithmetic circuit 61 reads waveform length Lw2 of the liquid level wave corresponding to propagation velocity v. It is possible to more appropriately shorten the propagation path detection period compared to the configuration where the memory 63 stores the waveform length as a fixed value.

It is expected that the reference wave reflecting off the reference plane 31a returns to the ultrasonic sensor 10 at a timing during the period that causes an ultrasonic wave to propagate through the path between the ultrasonic element 11 and the reference plane 31a at a propagation velocity between the highest and the lowest propagation velocities. A rising edge may be detected during other periods. Then, it is supposed that the rising edge is not based on the position of the reference plane 31a.

As a solution, the ultrasonic distance measuring device 100 is assigned with the reference detection period to detect a rising edge corresponding to the reference wave based on reference distance L1, highest propagation velocity vh, and lowest propagation velocity vl. The ultrasonic distance measuring device 100 computes propagation velocity v based on the elapsed time (reference time t01) after the output of the ultrasonic wave corresponding to the rising edge during the reference detection period; and reference distance L1.

It is possible to inhibit propagation velocity v from being computed through the use of a signal not based on the position of the reference plane 31a. As a result, it is possible to inhibit the distance measurement accuracy from degrading.

When the memory 63 stores reference time t01, the arithmetic circuit 61 updates the reference detection period based on reference time t01 and waveform length Lw1 of the reference wave. The reference detection period is then shortened. It is possible to more effectively inhibit propagation velocity v from being computed through the use of a signal not based on the position of the reference plane 31a.

The memory 63 in advance stores the correlation between propagation velocity v (fuel temperature) and waveform length Lw1 of the reference wave. From the correlation stored in the memory 63, the arithmetic circuit 61 reads waveform length Lw1 of the reference wave corresponding to propagation velocity v. It is possible to more appropriately shorten the reference detection period compared to the configuration where the memory 63 stores the waveform length as a fixed value.

There have been described the preferred embodiments of the present disclosure. However, the disclosure is not limited to the above-mentioned embodiments but may be otherwise variously modified within the spirit and scope of the disclosure.

First Modification

The present embodiment has described that the ultrasonic distance measuring device 100 detects positions of the liquid level 210a of the fuel 210 in the fuel tank 200. However, a detected fluid for the ultrasonic distance measuring device 100 is not limited to the fuel 210 such as gasoline. Detected fluids may include washer solution, cooling fluid, brake fluid, and AT fluid, for example.

According to the above-described example, the memory 63 stores lowest propagation velocity vl and highest propagation velocity vh regarding the fuel 210. However, the memory 63 may be configured to store lowest propagation velocity vl and highest propagation velocity vh regarding other than the fuel 210.

Figure 15:
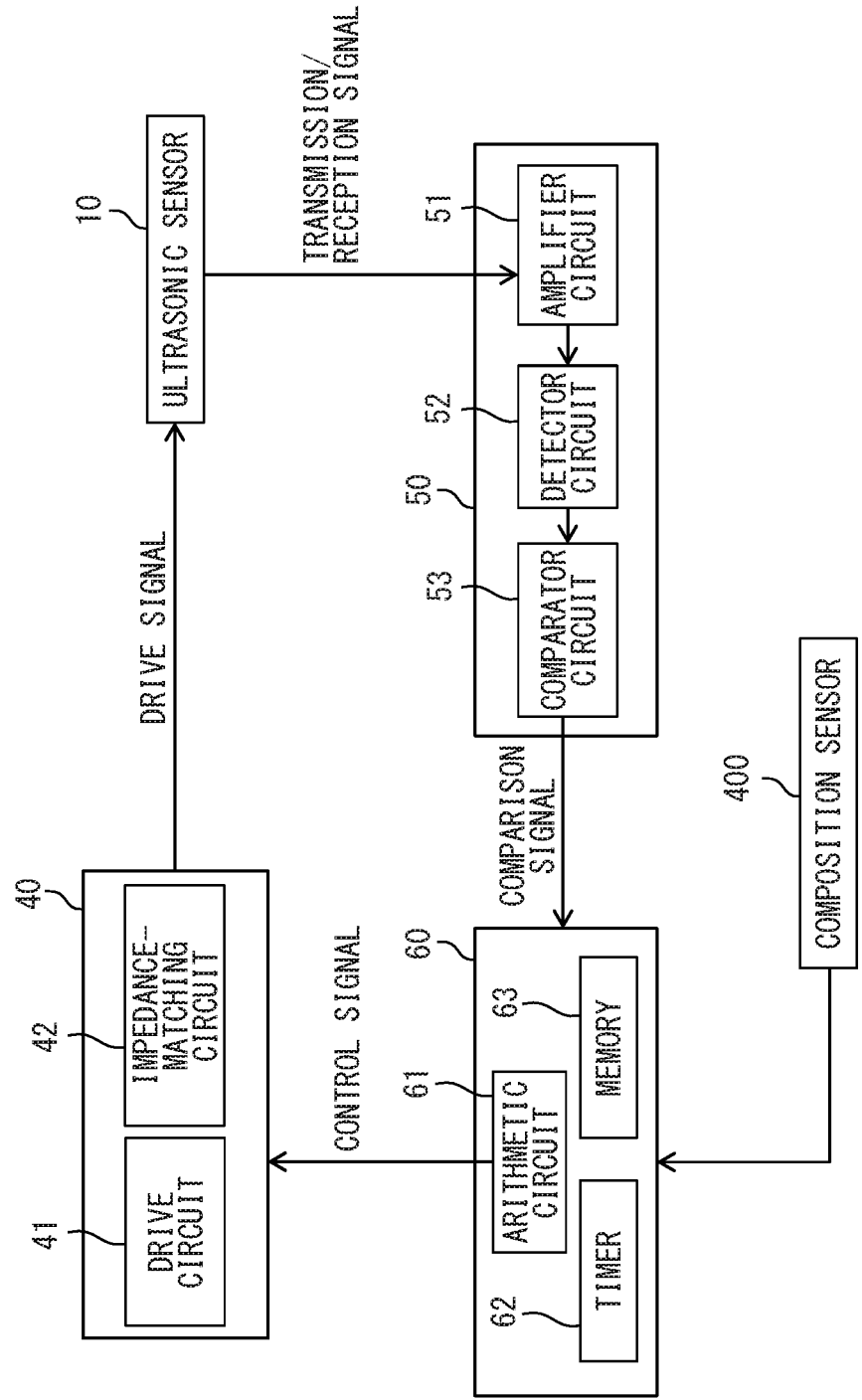
FIG. 15 is a block diagram illustrating a modification of the ultrasonic distance measuring device.

As illustrated in FIG. 15, the ultrasonic distance measuring device 100 according to the above-described modification includes a composition sensor 400 to detect the composition of a medium that causes an ultrasonic wave to output. An output from the composition sensor 400 is input to the arithmetic circuit 61. From the memory 63, the arithmetic circuit 61 reads lowest propagation velocity vl and highest propagation velocity vh regarding the medium composition detected by the composition sensor 400. The memory 63 may store ultrasonic wavelengths regarding the medium composition in addition to lowest propagation velocity vl and highest propagation velocity vh.

Other Modifications

The present embodiment has described the example where the arithmetic circuit 61 sets the reference detection period and the propagation path detection period after computing the elapsed time. However, the arithmetic circuit 61 may compute the elapsed time after setting the reference detection period and the propagation path detection period.

As illustrated in FIG. 13, the present embodiment has described the example of updating the reference detection period through the use of reference time t01 stored in the memory 63, if any. However, the reference detection period may be permanently set based on reference distance L1, highest propagation velocity vh, and lowest propagation velocity vl without updating the reference detection period.

As illustrated in FIG. 14, the present embodiment has described the example of updating the liquid level detection period through the use of propagation path time t02 stored in the memory 63, if any. However, the liquid level detection period may be set based on propagation velocity v, shortest propagation path length Ll, and longest propagation path length Lh without updating the liquid level detection period.

The present embodiment has described the example where the single arithmetic circuit 61 performs the process of computing propagation velocities of an ultrasonic wave, the process of setting a detection period, and the process of computing a propagation path length. However, these three types of processes may be performed on different processing circuits.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An ultrasonic distance measuring device configured to measure a length of an ultrasonic wave propagation path between a liquid level of a detected fluid reserved in a tank and an ultrasonic element, the ultrasonic distance measuring device comprising:
   a transmission pipe including a reference pipe and a detection pipe, wherein the reference pipe has a predetermined length and extends in a horizontal direction orthogonal to a height direction along which the ultrasonic element and the liquid level are placed, wherein the detection pipe extends in the height direction toward the liquid level from a distal end of the reference pipe, such that a cavity of the reference pipe and a cavity of the detection pipe communicate with each other;
   the ultrasonic element configured to generate an ultrasonic wave in the cavity of the reference pipe toward the distal end of the reference pipe and to convert an input ultrasonic wave into an electric signal;
   a transmission circuit configured to output a drive signal that causes the ultrasonic element to generate an ultrasonic wave;
   a comparator circuit configured to output a detection signal when the electric signal converted by the ultrasonic element is greater than a threshold value;
   a storage unit configured to store
      the predetermined length of the reference pipe and
      a longest propagation path length and a shortest propagation path length of the propagation path;
   a first arithmetic circuit configured to compute a propagation velocity of an ultrasonic wave propagating through the propagation path based on a first time difference between an output timing, at which the ultrasonic element outputs an ultrasonic wave, and a reference timing, at which the comparator circuit outputs the detection signal based on an ultrasonic wave reflecting off the distal end of the reference pipe, and the predetermined length of the reference pipe stored in the storage unit;
   a period circuit configured to set a propagation path detection period to detect a liquid level timing, at which the comparator circuit outputs the detection signal based on an ultrasonic wave reflecting off the liquid level, based on the longest propagation path length and the shortest propagation path length stored in the storage unit and the propagation velocity of an ultrasonic wave computed by the first arithmetic circuit; and
   a second arithmetic circuit configured to compute the length of the propagation path based on a second time difference, which is between the liquid level timing and the output timing during the propagation path detection period, and the propagation velocity of an ultrasonic wave computed by the first arithmetic circuit.

2. The ultrasonic distance measuring device according to claim 1, wherein
   the storage unit is configured to store a waveform length of an ultrasonic wave reflecting off the propagation path and entering the ultrasonic element in addition to the predetermined length of the reference pipe, the longest propagation path length, and the shortest propagation path length,
   the second arithmetic circuit is configured to cause the storage unit to store the computed second time difference,
   when the storage unit does not store the second time difference, the period circuit is configured to set the propagation path detection period based on the longest propagation path length and the shortest propagation path length stored in the storage unit and the propagation velocity of an ultrasonic wave computed by the first arithmetic circuit, and
   when the storage unit stores the second time difference, the period circuit is configured to set the propagation path detection period based on the second time difference and the waveform length of an ultrasonic wave stored in the storage unit.

3. The ultrasonic distance measuring device according to claim 2, wherein
the storage unit is configured to store a correlation between the propagation velocity of an ultrasonic wave and the waveform length of an ultrasonic wave, and
when the storage unit stores the second time difference, the period circuit is configured to set the propagation path detection period based on the second time difference stored in the storage unit and the waveform length of an ultrasonic wave stored in the storage unit and corresponding to the propagation velocity of an ultrasonic wave computed by the first arithmetic circuit.

4. The ultrasonic distance measuring device according to claim 1, wherein
the storage unit is configured to store a highest first velocity and a lowest second velocity of an ultrasonic wave propagating through the propagation path at an operating ambient temperature of the ultrasonic element, in addition to the predetermined length of the reference pipe, the longest propagation path length, and the shortest propagation path length,
the period circuit is configured to set, in addition to the propagation path detection period, a reference detection period to detect the reference timing based on the predetermined length of the reference pipe, the first velocity, and the second velocity stored in the storage unit, and
the first arithmetic circuit is configured to compute the propagation velocity of an ultrasonic wave based on the first time difference, which is between the reference timing and the output timing during the reference detection period, and the predetermined length of the reference pipe.

5. The ultrasonic distance measuring device according to claim 4, wherein
the storage unit is configured to store the waveform length of an ultrasonic wave reflecting off in the propagation path and entering the ultrasonic element, in addition to the predetermined length of the reference pipe, the longest propagation path length, the shortest propagation path length, the first velocity, and the second velocity,
the first arithmetic circuit is configured to cause the storage unit to store the computed first time difference,
when the storage unit does not store the first time difference, the period circuit is configured to set the reference detection period based on the predetermined length of the reference pipe, the first velocity, and the second velocity, and when the storage unit stores the first time difference, the period circuit is configured to set the reference detection period based on the first time difference and the waveform length of an ultrasonic wave stored in the storage unit.

6. The ultrasonic distance measuring device according to claim 5, wherein
the storage unit is configured to store a correlation between the propagation velocity of an ultrasonic wave and the waveform length of an ultrasonic wave, and
when the storage unit stores the first time difference, the period circuit is configured to set the reference detection period based on the first time difference and the waveform length of an ultrasonic wave corresponding to the propagation velocity of an ultrasonic wave computed by the first arithmetic circuit, the first time difference, and the waveform length stored in the storage unit.

7. The ultrasonic distance measuring device according to claim 6, wherein
the first arithmetic circuit is configured to select one reference timing, among a plurality of the detection signals during the reference detection period, corresponding to a timing, at which the comparator circuit outputs the detection signal and that is smallest in difference from the output timing.

8. The ultrasonic distance measuring device according to claim 1, wherein
the second arithmetic circuit is configured to select one liquid level timing, among included in a plurality of the detection signals during the propagation path detection period, corresponding to a timing, at which the comparator circuit outputs the detection signal and that is smallest in difference from the output timing.

9. The ultrasonic distance measuring device according to claim 1, wherein
the detected fluid is fuel.

10. The ultrasonic distance measuring device according to claim 1, wherein
the ultrasonic distance measuring device is provided in the detected fluid reserved in the tank.

11. The ultrasonic distance measuring device according to claim 1, wherein
the second arithmetic circuit is configured to compute the length of the propagation path without using the liquid level timing detected in a period other than the propagation path detection period.

* * * * *